(12) United States Patent
Moshfeghi

(10) Patent No.: US 10,581,509 B2
(45) Date of Patent: *Mar. 3, 2020

(54) METHOD AND SYSTEM FOR DISTRIBUTED TRANSCEIVERS FOR DISTRIBUTED ACCESS POINTS CONNECTIVITY

(71) Applicant: Golba LLC

(72) Inventor: Mehran Moshfeghi, Rancho Palos Verdes, CA (US)

(73) Assignee: GOLBA LLC, Rancho Palos Verdes, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 15/595,919

(22) Filed: May 15, 2017

(65) Prior Publication Data
US 2017/0317734 A1 Nov. 2, 2017

Related U.S. Application Data

(63) Continuation of application No. 14/940,130, filed on Nov. 12, 2015, now Pat. No. 9,680,554, which is a
(Continued)

(51) Int. Cl.
H04W 4/00 (2018.01)
H04B 7/06 (2006.01)
(Continued)

(52) U.S. Cl.
CPC ............. *H04B 7/0697* (2013.01); *H04B 7/02* (2013.01); *H04B 7/024* (2013.01); *H04B 7/0456* (2013.01);
(Continued)

(58) Field of Classification Search
CPC ..................................................... H04W 4/00
See application file for complete search history.

(56) References Cited

U.S. PATENT DOCUMENTS 3,618,097 A 11/1971 McLeod, Jr.
5,525,990 A 6/1996 Lewis
(Continued)

FOREIGN PATENT DOCUMENTS

WO WO 2013/058998 4/2013
WO WO 2013/058999 4/2013

OTHER PUBLICATIONS

U.S. Appl. No. 16/153,735, filed Oct. 6, 2018, Moshfeghi, Mehran.
(Continued)

*Primary Examiner* — Sulaiman Nooristany
(74) *Attorney, Agent, or Firm* — Chip Law Group

(57) ABSTRACT

A controlling entity communicates with a plurality of network devices having a plurality of distributed transceivers and one or more corresponding antenna arrays. The controlling entity receives information, such as location information, propagation environment characteristics, physical environment characteristics and/or link parameters and quality from the network devices and/or communication devices that are communicatively coupled to the plurality of network devices. The controlling entity coordinates communication of data streams for the distributed transceivers and the antenna arrays based on the received information. The network device comprises an access point, a router, a switching device, a gateway and/or a set top box. The controlling entity is located within or external to one of the network devices. One or more functions performed by the controlling entity are split between the controlling entity and one or more of the network devices.

22 Claims, 6 Drawing Sheets

Related U.S. Application Data continuation of application No. 13/919,922, filed on Jun. 17, 2013, now Pat. No. 9,197,982.

(60) Provisional application No. 61/725,005, filed on Nov. 11, 2012, provisional application No. 61/680,872, filed on Aug. 8, 2012.

(51) Int. Cl.

| | | |
|---|---|---|
| *H04B 17/26* | (2015.01) | |
| *H04W 84/00* | (2009.01) | |
| *H04B 17/336* | (2015.01) | |
| *H04B 17/382* | (2015.01) | |
| *H04W 76/15* | (2018.01) | |
| *H04B 7/02* | (2018.01) | |
| *H04B 7/024* | (2017.01) | |
| *H04B 7/0456* | (2017.01) | |
| *H04B 17/309* | (2015.01) | |
| *H04B 7/08* | (2006.01) | |
| *H04B 7/10* | (2017.01) | |
| *H04B 7/12* | (2006.01) | |
| *H04L 5/00* | (2006.01) | |
| *H04L 7/033* | (2006.01) | |
| *H04L 12/64* | (2006.01) | |
| *H04W 24/02* | (2009.01) | |
| *H04W 16/10* | (2009.01) | |

(52) U.S. Cl.
CPC ......... *H04B 7/0617* (2013.01); *H04B 7/0689* (2013.01); *H04B 7/0871* (2013.01); *H04B 7/10* (2013.01); *H04B 7/12* (2013.01); *H04B 17/26* (2015.01); *H04B 17/309* (2015.01); *H04B 17/336* (2015.01); *H04B 17/382* (2015.01); *H04L 5/0048* (2013.01); *H04L 7/033* (2013.01); *H04L 12/6418* (2013.01); *H04W 4/00* (2013.01); *H04W 24/02* (2013.01); *H04W 76/15* (2018.02); *H04W 84/00* (2013.01); *H04W 16/10* (2013.01)

(56) References Cited

U.S. PATENT DOCUMENTS

| | | | |
|---|---|---|---|
| 5,771,017 A | 6/1998 | Dean et al. | |
| 5,905,473 A | 5/1999 | Taenzer | |
| 5,936,577 A | 8/1999 | Shoki et al. | |
| 5,940,033 A | 8/1999 | Locher et al. | |
| 6,018,316 A | 1/2000 | Rudish et al. | |
| 6,405,018 B1 | 6/2002 | Reudink et al. | |
| 6,487,417 B1 | 11/2002 | Rossoni | |
| 6,577,631 B1 | 6/2003 | Keenan et al. | |
| 6,600,776 B1 | 7/2003 | Alamouti | |
| 6,718,159 B1 | 4/2004 | Sato | |
| 6,802,035 B2 | 10/2004 | Catreux et al. | |
| 7,058,367 B1 | 6/2006 | Luo et al. | |
| 7,187,949 B2 | 3/2007 | Chang et al. | |
| 7,206,294 B2 | 4/2007 | Garahi et al. | |
| 7,248,217 B2 | 7/2007 | Mani et al. | |
| 7,248,841 B2 | 7/2007 | Agee et al. | |
| 7,260,141 B2 | 8/2007 | Bierly et al. | |
| 7,333,455 B1 | 2/2008 | Bolt | |
| 7,339,979 B1 | 3/2008 | Kelkar | |
| 7,424,225 B1 | 9/2008 | Elliott | |
| 7,574,236 B1 | 8/2009 | Mansour | |
| 7,636,573 B2 | 12/2009 | Walton et al. | |
| 7,688,909 B2 | 3/2010 | Tsutsui | |
| 7,689,216 B2 | 3/2010 | Wandel et al. | |
| 7,710,319 B2 | 5/2010 | Nassiri-Toussi et al. | |
| 7,890,114 B2 | 2/2011 | Braun et al. | |
| 7,904,117 B2 | 3/2011 | Doan et al. | |
| 7,986,742 B2 | 7/2011 | Ketchum et al. | |
| 8,098,752 B2 | 1/2012 | Hwang et al. | |
| 8,126,408 B2 | 2/2012 | Ahrony et al. | |
| 8,140,122 B2 | 3/2012 | Park et al. | |
| 8,160,601 B2 | 4/2012 | Veselinovic et al. | |
| 8,175,184 B2 | 5/2012 | Kim | |
| 8,190,102 B2 | 5/2012 | Rofougaran | |
| 8,203,978 B2 | 6/2012 | Walton et al. | |
| 8,279,132 B2 | 10/2012 | Jung et al. | |
| 8,280,445 B2 | 10/2012 | Yong et al. | |
| 8,314,736 B2 | 11/2012 | Moshfeghi | |
| 8,320,304 B2 | 11/2012 | Deb et al. | |
| 8,364,188 B2 | 1/2013 | Srinivasan et al. | |
| 8,369,791 B2 | 2/2013 | Hafeez | |
| 8,385,305 B1 | 2/2013 | Negus et al. | |
| 8,385,452 B2 | 2/2013 | Gorokhov | |
| 8,396,157 B2 | 3/2013 | Li et al. | |
| 8,570,988 B2 | 10/2013 | Wallace et al. | |
| 8,620,301 B1 | 12/2013 | Hessel | |
| 8,644,262 B1 | 2/2014 | Sun et al. | |
| 8,654,815 B1 | 2/2014 | Forenza et al. | |
| 8,750,264 B2 | 6/2014 | Shatti | |
| 8,780,943 B2 | 7/2014 | Moshfeghi | |
| 8,787,469 B2 | 7/2014 | Kim | |
| 8,817,678 B2 | 8/2014 | Moshfeghi | |
| 8,854,255 B1 | 10/2014 | Ehret | |
| 8,885,628 B2 | 11/2014 | Palanki et al. | |
| 9,037,094 B2 | 5/2015 | Moshfeghi | |
| 9,112,648 B2 | 8/2015 | Moshfeghi | |
| 9,185,601 B2 | 11/2015 | Frerking | |
| 9,197,982 B2 | 11/2015 | Moshfeghi | |
| 9,225,482 B2 | 12/2015 | Moshfeghi | |
| 9,226,092 B2 | 12/2015 | Moshfeghi | |
| 9,252,908 B1 | 2/2016 | Branlund | |
| 9,253,587 B2 | 2/2016 | Moshfeghi | |
| 9,438,389 B2 | 9/2016 | Moshfeghi | |
| 9,548,805 B2 | 1/2017 | Moshfeghi | |
| 9,602,257 B2 | 3/2017 | Moshfeghi | |
| 9,660,777 B2 | 5/2017 | Moshfeghi | |
| 9,680,554 B2 | 6/2017 | Moshfeghi | |
| 9,686,060 B2 | 6/2017 | Moshfeghi | |
| 9,698,948 B2 | 7/2017 | Moshfeghi | |
| 9,736,637 B2 | 8/2017 | Larsen | |
| 9,780,928 B2 | 10/2017 | Moshfeghi | |
| 9,923,620 B2 | 3/2018 | Moshfeghi | |
| 10,020,861 B2 | 7/2018 | Moshfeghi | |
| 10,069,608 B2 | 9/2018 | Moshfeghi | |
| 10,084,576 B2 | 9/2018 | Moshfeghi | |
| 10,103,853 B2 | 10/2018 | Moshfeghi | |
| 2002/0193074 A1 | 12/2002 | Squibbs | |
| 2002/0196186 A1 | 12/2002 | Holt | |
| 2003/0012208 A1 | 1/2003 | Bernheim et al. | |
| 2003/0125040 A1 | 7/2003 | Walton et al. | |
| 2003/0129989 A1 | 7/2003 | Gholmieh et al. | |
| 2003/0236109 A1 | 12/2003 | Nagata | |
| 2004/0077354 A1 | 4/2004 | Jason et al. | |
| 2004/0082356 A1 | 4/2004 | Walton et al. | |
| 2004/0095907 A1 | 5/2004 | Agee et al. | |
| 2004/0110469 A1 | 6/2004 | Judd et al. | |
| 2004/0116129 A1 | 6/2004 | Wilson | |
| 2004/0166808 A1 | 8/2004 | Hasegawa et al. | |
| 2005/0048964 A1 | 3/2005 | Cohen et al. | |
| 2005/0069252 A1 | 3/2005 | Hwang et al. | |
| 2005/0088358 A1 | 4/2005 | Larry et al. | |
| 2005/0136943 A1* | 6/2005 | Banerjee ............... | H04B 1/7115 455/456.1 |
| 2005/0181755 A1 | 8/2005 | Hoshino et al. | |
| 2005/0232216 A1 | 10/2005 | Webster et al. | |
| 2005/0237971 A1 | 10/2005 | Skraparlis | |
| 2005/0243756 A1 | 11/2005 | Cleveland et al. | |
| 2006/0063494 A1 | 3/2006 | Zhang et al. | |
| 2006/0121946 A1 | 6/2006 | Walton et al. | |
| 2006/0246922 A1 | 11/2006 | Gasbarro et al. | |
| 2007/0052519 A1 | 3/2007 | Talty et al. | |
| 2007/0066254 A1 | 3/2007 | Tsuchie | |
| 2007/0093270 A1 | 4/2007 | Lagnado | |
| 2007/0100548 A1 | 5/2007 | Small | |
| 2007/0116012 A1 | 5/2007 | Chang et al. | |
| 2008/0166975 A1 | 7/2008 | Kim et al. | |
| 2008/0167049 A1 | 7/2008 | Karr et al. | |
| 2008/0212582 A1 | 9/2008 | Zwart et al. | |

(56) References Cited

U.S. PATENT DOCUMENTS

| | | |
|---|---|---|
| 2008/0261509 A1 | 10/2008 | Sen |
| 2008/0305820 A1 | 12/2008 | Sadiq et al. |
| 2009/0028120 A1 | 1/2009 | Lee |
| 2009/0029645 A1 | 1/2009 | Leroudier |
| 2009/0093265 A1 | 4/2009 | Kimura et al. |
| 2009/0156227 A1 | 6/2009 | Frerking et al. |
| 2009/0161235 A1 | 6/2009 | Border |
| 2009/0233545 A1 | 9/2009 | Sutkoveran, II |
| 2009/0325479 A1 | 12/2009 | Chakrabarti et al. |
| 2010/0080197 A1 | 4/2010 | Kanellakis et al. |
| 2010/0090898 A1 | 4/2010 | Gallagher et al. |
| 2010/0105403 A1 | 4/2010 | Lennartson et al. |
| 2010/0117890 A1 | 5/2010 | Vook et al. |
| 2010/0124895 A1 | 5/2010 | Martin et al. |
| 2010/0136922 A1 | 6/2010 | Rofougaran |
| 2010/0167639 A1 | 7/2010 | Ranson et al. |
| 2010/0172309 A1 | 7/2010 | Forenza et al. |
| 2010/0220012 A1 | 9/2010 | Reede |
| 2010/0273504 A1 | 10/2010 | Bull et al. |
| 2010/0291918 A1 | 11/2010 | Suzuki |
| 2010/0304680 A1 | 12/2010 | Kuffner et al. |
| 2010/0304770 A1 | 12/2010 | Wietfeldt et al. |
| 2010/0328157 A1 | 12/2010 | Culkin et al. |
| 2011/0002410 A1 | 1/2011 | Forenza et al. |
| 2011/0003610 A1 | 1/2011 | Key et al. |
| 2011/0069773 A1 | 3/2011 | Doron et al. |
| 2011/0081875 A1 | 4/2011 | Imamura et al. |
| 2011/0105032 A1 | 5/2011 | Maruhashi et al. |
| 2011/0105167 A1 | 5/2011 | Pan et al. |
| 2011/0140954 A1 | 6/2011 | Fortuny-Guasch |
| 2011/0194504 A1 | 8/2011 | Gorokhov et al. |
| 2011/0212684 A1 | 9/2011 | Nam et al. |
| 2011/0299441 A1 | 12/2011 | Petrovic |
| 2012/0002742 A1 | 1/2012 | Cheng |
| 2012/0082070 A1 | 4/2012 | Hart et al. |
| 2012/0082072 A1 | 4/2012 | Shen |
| 2012/0083207 A1 | 4/2012 | Rofougaran et al. |
| 2012/0083225 A1 | 4/2012 | Rofougaran et al. |
| 2012/0083233 A1 | 4/2012 | Rofougaran et al. |
| 2012/0083306 A1 | 4/2012 | Rofougaran et al. |
| 2012/0093209 A1 | 4/2012 | Schmidt et al. |
| 2012/0120884 A1 | 5/2012 | Yu et al. |
| 2012/0129543 A1 | 5/2012 | Patel et al. |
| 2012/0131650 A1 | 5/2012 | Gutt et al. |
| 2012/0149300 A1 | 6/2012 | Forster |
| 2012/0184203 A1 | 7/2012 | Tulino et al. |
| 2012/0184219 A1 | 7/2012 | Richardson |
| 2012/0194385 A1 | 8/2012 | Schmidt et al. |
| 2012/0230274 A1 | 9/2012 | Xiao et al. |
| 2012/0238202 A1 | 9/2012 | Kim et al. |
| 2012/0250659 A1* | 10/2012 | Sambhwani ......... H04W 36/30 370/332 |
| 2012/0314570 A1 | 12/2012 | Forenza et al. |
| 2013/0040558 A1 | 2/2013 | Kazmi |
| 2013/0044028 A1 | 2/2013 | Lea et al. |
| 2013/0057447 A1 | 3/2013 | Pivit et al. |
| 2013/0095747 A1 | 4/2013 | Moshfeghi |
| 2013/0114468 A1 | 5/2013 | Hui et al. |
| 2013/0155891 A1 | 6/2013 | Dinan |
| 2013/0272437 A1 | 10/2013 | Edison |
| 2013/0287139 A1 | 10/2013 | Zhu et al. |
| 2013/0343235 A1 | 12/2013 | Khan |
| 2014/0010319 A1 | 1/2014 | Baik et al. |
| 2014/0045541 A1 | 2/2014 | Moshfeghi |
| 2014/0086191 A1 | 3/2014 | Berntsen |
| 2014/0133435 A1 | 5/2014 | Forenza |
| 2014/0241296 A1 | 8/2014 | Shattil |
| 2015/0241020 A1 | 8/2015 | Lee |
| 2016/0211905 A1 | 7/2016 | Moshfeghi |
| 2017/0126374 A1 | 5/2017 | Moshfeghi |
| 2017/0156069 A1 | 6/2017 | Moshfeghi |
| 2017/0230099 A1 | 8/2017 | Moshfeghi |
| 2017/0257155 A1 | 9/2017 | Liang et al. |
| 2017/0279573 A1 | 9/2017 | Moshfeghi |
| 2017/0317801 A1 | 11/2017 | Moshfeghi |
| 2017/0338921 A1 | 11/2017 | Moshfeghi |
| 2018/0091270 A1 | 3/2018 | Moshfeghi |
| 2018/0234158 A1 | 8/2018 | Moshfeghi |
| 2018/0375564 A1 | 12/2018 | Moshfeghi |
| 2019/0074942 A1 | 3/2019 | Moshfeghi |
| 2019/0089501 A1 | 3/2019 | Moshfeghi |
| 2019/0097713 A1 | 3/2019 | Moshfeghi |
| 2019/0097770 A1 | 3/2019 | Moshfeghi |

OTHER PUBLICATIONS

U.S. Appl. No. 16/231,903, filed Dec. 24, 2018, Moshfeghi, Mehran.
U.S. Appl. No. 16/364,956, filed Mar. 26, 2019, Moshfeghi, Mehran.
Portions of prosecution history of U.S. Appl. No. 15/616,911, Jan. 3, 2019, Moshfeghi, Mehran.
Portions of prosecution history of U.S. Appl. No. 15/441,209, Mar. 28, 2019, Moshfeghi, Mehran.
Portions of prosecution history of U.S. Appl. No. 15/229,135, May 9, 2018, Moshfeghi, Mehran.
Portions of prosecution history of U.S. Appl. No. 16/125,757, Sep. 9, 2018, Moshfeghi, Mehran.
Portions of prosecution history of U.S. Appl. No. 15/595,940, Aug. 21, 2018, Moshfeghi, Mehran.
Portions of prosecution history of U.S. Appl. No. 16/101,044, Dec. 26, 2018, Moshfeghi, Mehran.
Portions of prosecution history of U.S. Appl. No. 15/706,759, Jan. 23, 2019, Moshfeghi, Mehran.
Portions of prosecution history of U.S. Appl. No. 16/129,413, Feb. 4, 2019, Moshfeghi, Mehran.
Portions of prosecution history of U.S. Appl. No. 13/473,144, Aug. 29, 2018, Moshfeghi, Mehran.
Portions of prosecution history of U.S. Appl. No. 15/853,537, Sep. 26, 2018, Moshfeghi, Mehran.
Portions of prosecution history of U.S. Appl. No. 13/919,932, Jun. 20, 2018, Moshfeghi, Mehran.
Portions of prosecution history of U.S. Appl. No. 16/016,619, Sep. 25, 2018, Moshfeghi, Mehran.
Portions of prosecution history of U.S. Appl. No. 14/980,338, Feb. 28, 2018, Moshfeghi, Mehran.
Portions of prosecution history of U.S. Appl. No. 15/893,626, Jun. 12, 2018, Moshfeghi, Mehran.
Portions of prosecution history of U.S. Appl. No. 16/129,423, Feb. 4, 2019, Moshfeghi, Mehran.
Portions of prosecution history of U.S. Appl. No. 15/372,417, Mar. 21, 2019, Moshfeghi, Mehran.
U.S. Appl. No. 15/706,759, filed Sep. 17, 2017, Moshfeghi, Mehran.
U.S. Appl. No. 15/853,537, filed Dec. 22, 2017, Moshfeghi, Mehran.
Portions of prosecution history of U.S. Appl. No. 13/473,083, Apr. 17, 2015, Moshfeghi, Mehran.
Portions of prosecution history of U.S. Appl. No. 14/709,136, Jun. 1, 2017, Moshfeghi, Mehran.
Portions of prosecution history of U.S. Appl. No. 15/616,911, Nov. 9, 2017, Moshfeghi, Mehran.
Portions of prosecution history of U.S. Appl. No. 13/473,096, Jul. 20, 2015, Moshfeghi, Mehran.
Portions of prosecution history of U.S. Appl. No. 14/813,058, Feb. 17, 2017, Moshfeghi, Mehran.
Portions of prosecution history of U.S. Appl. No. 13/473,105, Jul. 30, 2014, Moshfeghi, Mehran.
Portions of prosecution history of U.S. Appl. No. 14/455,859, Aug. 12, 2016, Moshfeghi, Mehran.
Portions of prosecution history of U.S. Appl. No. 15/229,135, Dec. 21, 2017, Moshfeghi, Mehran.
Portions of prosecution history of U.S. Appl. No. 13/473,113, Nov. 24, 2015, Moshfeghi, Mehran.
Portions of prosecution history of U.S. Appl. No. 14/980,281, May 17, 2017, Moshfeghi, Mehran.
Portions of prosecution history of U.S. Appl. No. 15/595,940, Nov. 17, 2017, Moshfeghi, Mehran.
Portions of prosecution history of U.S. Appl. No. 13/473,160, Sep. 5, 2017, Moshfeghi, Mehran.
Portions of prosecution history of U.S. Appl. No. 13/473,144, Dec. 7, 2017, Moshfeghi, Mehran.

(56) References Cited

OTHER PUBLICATIONS

Portions of prosecution history of U.S. Appl. No. 15/853,537, Dec. 22, 2017, Moshfeghi, Mehran.
Portions of prosecution history of U.S. Appl. No. 13/473,180, Jun. 11, 2014, Moshfeghi, Mehran.
Portions of prosecution history of U.S. Appl. No. 14/325,218, Apr. 20, 2017, Moshfeghi, Mehran.
Portions of prosecution history of U.S. Appl. No. 15/472,148, Oct. 4, 2017, Moshfeghi, Mehran.
Portions of prosecution history of U.S. Appl. No. 13/919,958, Jan. 6, 2016, Moshfeghi, Mehran.
Portions of prosecution history of U.S. Appl. No. 13/919,932, Dec. 19, 2017, Moshfeghi, Mehran.
Portions of prosecution history of U.S. Appl. No. 13/919,967, Nov. 20, 2015, Moshfeghi, Mehran.
Portions of prosecution history of U.S. Appl. No. 14/980,338, Oct. 31, 2017, Moshfeghi, Mehran
Portions of prosecution history of U.S. Appl. No. 13/919,922, Oct. 27, 2015, Moshfeghi, Mehran.
Portions of prosecution history of U.S. Appl. No. 14/940,130, May 4, 2017, Moshfeghi, Mehran.
Portions of prosecution history of U.S. Appl. No. 13/919,972, Dec. 20, 2016, Moshfeghi, Mehran.
Portions of prosecution history of U.S. Appl. No. 15/372,417, Jul. 28, 2017, Moshfeghi, Mehran.
International Search Report and Written Opinion of PCT/US2012/058839, dated Jan. 4, 2013, Golba LLC.
International Search Report and Written Opinion of PCT/US2012/058842, dated Jan. 4, 2013, Golba LLC.
Corrected Notice of Allowance for U.S. Appl. No. 16/031,007 dated Sep. 16, 2019.
Misc Communication from USPTO for U.S. Appl. No. 16/382,386 dated Oct. 8, 2019.
Non-Final Office Action for U.S. Appl. No. 16/231,903 dated Sep. 18, 2019.
Non-Final Office Action for U.S. Appl. No. 16/294,025 dated Sep. 12, 2019.
Non-Final Office Action for U.S. Appl. No. 16/526,544 dated Sep. 18, 2019.
Notice of Allowance for U.S. Appl. No. 16/032,668 dated Sep. 20, 2019.
Notice of Allowance for U.S. Appl. No. 15/904,521 dated Sep. 20, 2019.
Notice of Allowance for U.S. Appl. No. 16/111,326 dated Oct. 10, 2019.
Corrected Notice of Allowance for U.S. Appl. No. 16/382,386 dated Dec. 30, 2019.
Corrected Notice of Allowance for U.S. Appl. No. 15/616,911 dated Oct. 31, 2019.
Corrected Notice of Allowance for U.S. Appl. No. 15/616,911 dated Dec. 12, 2019.
Corrected Notice of Allowance for U.S. Appl. No. 15/904,521 dated Jan. 8, 2020.
Corrected Notice of Allowance for U.S. Appl. No. 16/031,007 dated Oct. 22, 2019.
Corrected Notice of Allowance for U.S. Appl. No. 16/032,617 dated Jan. 9, 2020.
Corrected Notice of Allowance for U.S. Appl. No. 16/032,617 dated Oct. 28, 2019.
Corrected Notice of Allowance for U.S. Appl. No. 16/032,668 dated Dec. 30, 2019.
Corrected Notice of Allowance for U.S. Appl. No. 16/129,423 dated Nov. 7, 2019.
Final Office Action for U.S. Appl. No. 16/125,757 dated Dec. 2, 2019.
Non-Final Office Action for U.S. Appl. No. 16/388,043 dated Dec. 27, 2019.
Non-Final Office Action in U.S. Appl. No. 15/836,198 dated Oct. 31, 2019.
Notice of Allowance for U.S. Appl. No. 16/294,025 dated Jan. 13, 2020.
Notice of Allowance for U.S. Appl. No. 16/129,423 dated Nov. 27, 2019.

* cited by examiner

METHOD AND SYSTEM FOR DISTRIBUTED TRANSCEIVERS FOR DISTRIBUTED ACCESS POINTS CONNECTIVITY

CROSS-REFERENCE TO RELATED APPLICATIONS/INCORPORATION BY REFERENCE

This application is a continuation application of U.S. patent application Ser. No. 14/940,130, filed on Nov. 12, 2015, published as U.S. Patent Publication 2016/0142114. U.S. patent application Ser. No. 14/940,130 is a continuation application of U.S. patent application Ser. No. 13/919,922, filed Jun. 17, 2013, issued as U.S. Pat. No. 9,197,982. U.S. patent application Ser. No. 13/919,922 makes reference to, claims priority to and claims the benefit of U.S. Provisional Application Ser. No. 61/725,005, which was filed on Nov. 11, 2012; and U.S. Provisional Application Ser. No. 61/680,872, which was filed on Aug. 8, 2012. U.S. patent application Ser. No. 14/940,130, published as U.S. Patent Publication 2016/0142114 and U.S. patent application Ser. No. 13/919,922, issued as U.S. Pat. No. 9,197,982 are incorporated herein by reference.

This application also makes reference to:
U.S. application Ser. No. 13/473,096, which was filed on May 16, 2012;
U.S. application Ser. No. 13/473,144, which was filed on May 16, 2012;
U.S. application Ser. No. 13/473,105, which was filed on May 16, 2012;
U.S. application Ser. No. 13/473,160, which was filed on May 16, 2012;
U.S. application Ser. No. 13/473,180, which was filed on May 16, 2012;
U.S. application Ser. No. 13/473,113, which was filed on May 16, 2012;
U.S. application Ser. No. 13/473,083, which was filed on May 16, 2012;
U.S. application Ser. No. 13/919,932 which was filed on Jun. 17, 2013;
U.S. application Ser. No. 13/919,958 which was filed on Jun. 17, 2013;
U.S. application Ser. No. 13/919,967 which was filed on Jun. 17, 2013; and
U.S. application Ser. No. 13/919,972 which was filed Jun. 17, 2013.

Each of the above referenced application is hereby incorporated herein by reference in its entirety.

FIELD OF THE INVENTION

Certain embodiments of the invention relate to wireless communication systems. More specifically, certain embodiments of the invention relate to a method and system for distributed transceivers for distributed access points connectivity.

BACKGROUND OF THE INVENTION

Millimeter Wave (mmWave) devices are being utilized for high throughput wireless communications at very high carrier frequencies. There are several standards bodies such as, for example, 60 GHz wireless standard, WirelessHD, WiGig, and WiFi IEEE 802.11ad that utilize high frequencies such as the 60 GHz frequency spectrum for high throughput wireless communications. In the US, the 60 GHz spectrum band may be used for unlicensed short range data links such as data links within a range of 1.7 km, with data throughputs up to 6 Gbits/s. These higher frequencies may provide smaller wavelengths and enable the use of small high gain antennas. However, these higher frequencies may experience high propagation loss.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for distributed transceivers for distributed access points connectivity, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for distributed transceivers enabling distributed access points connectivity. In various aspects of the invention, a controlling entity communicates with a plurality of network devices having a plurality of distributed transceivers and one or more corresponding antenna arrays. The controlling entity receives information, such as location information, propagation environment characteristics, physical environment characteristics and/or link parameters and quality, from the network devices and/or communication devices that are communicatively coupled to the plurality of network devices. The controlling entity coordinates communication of data streams for the distributed transceivers and the antenna arrays based on the received information. The network device includes an access point, a router, a switching device, a gateway and/or a set top box. The controlling entity is located within or external to one of the network devices. One or more functions performed by the controlling entity are split between the controlling entity and one or more of the network devices. The controlling entity dynamically and/or adaptively controls adjustment of one or more configuration settings for the distributed transceivers and/or the antenna arrays based on the received information. The controlling entity stores the received information to generate a history of received information. The history of received information is aggregated with current information received from the network devices and/or from the communication devices. The controlling entity dynamically and/or adaptively controls adjustment of configuration settings for the distributed transceivers and/or antenna arrays in a plurality of network devices based on the aggregated history of received information and current received information. The controlling entity dynamically and/or adaptively controls two or more of the distributed transceivers in a network device to utilize different modes of operation and/or to split the communication of the data streams amongst one or more distributed transceivers in a plurality of network devices. Exemplary modes of operation may comprise a spatial diversity mode, a frequency diversity mode, a spatial multiplexing mode, a frequency multiplexing mode and a MIMO mode of operation. The controlling entity may backhaul traffic from the network devices via one or more wired and/or wireless communication links. The controlling entity may also configure two or more of the plurality of distributed transceivers in a network device to utilize different modulation schemes, constellations, protocols, frequencies, wireless standards and/or bandwidths to handle different types of data traffic and/or control traffic based on the received information.

Figure 1:
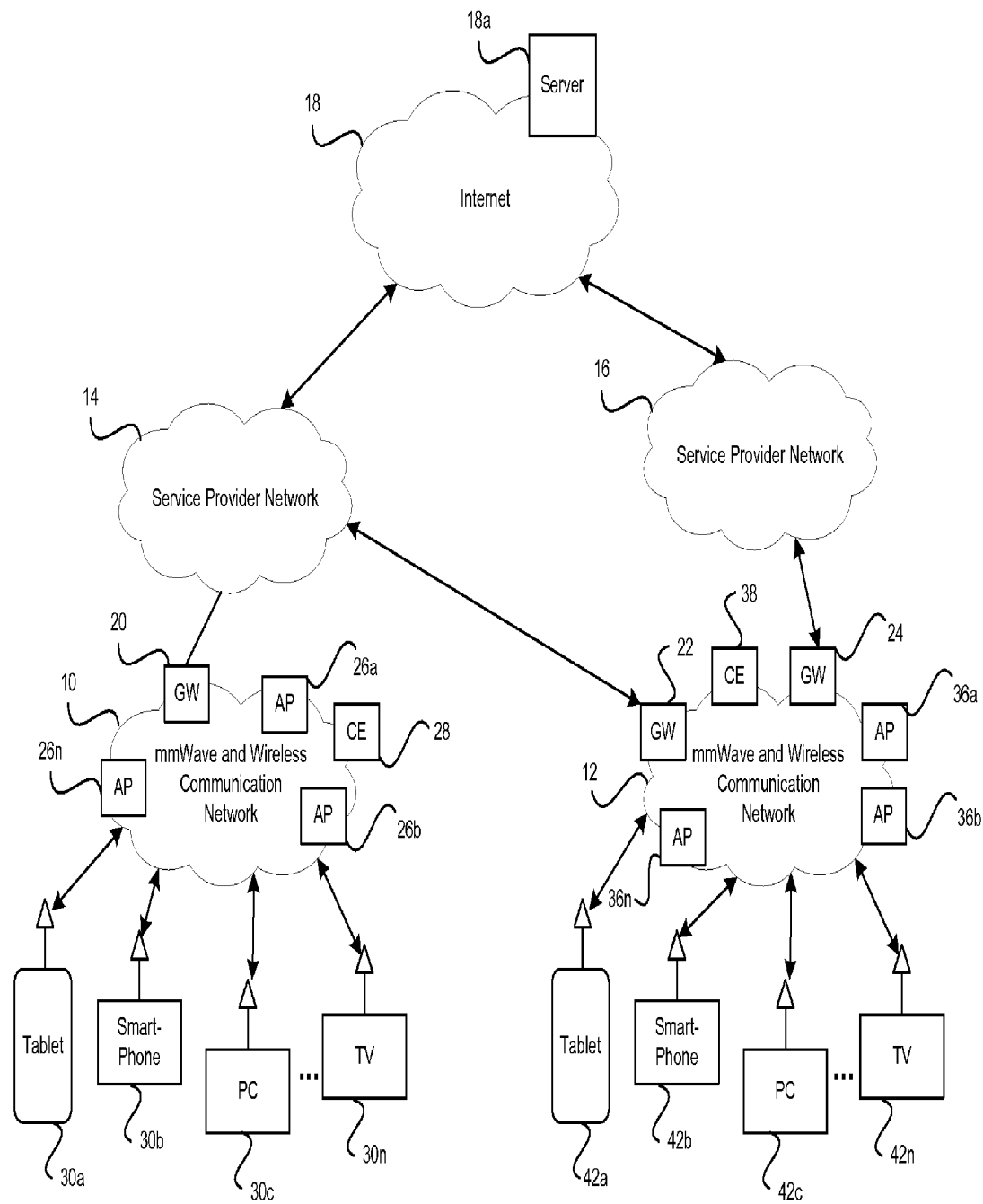
FIG. 1 is a block diagram of an exemplary system for providing connectivity to a plurality of distributed transceivers via a plurality of distributed access points, in accordance with an exemplary embodiment of the invention.

FIG. 1 is a block diagram of an exemplary system for providing connectivity to a plurality of distributed transceivers via a plurality of distributed access points, in accordance with an exemplary embodiment of the invention. Referring to FIG. 1, there are shown mmWave and wireless communication networks 10, 12, service providers 14, 16 and the Internet 18. The mmWave and wireless communication network 10 may comprise a gateway 20 and a plurality of access points 26a, 26b, . . . , 26n. The mmWave and wireless communication network 12 may comprise a gateway 22, a gateway 24, a plurality of access points 36a, 36b, . . . , 36n, and a coordinating entity 28. FIG. 1 also shows a plurality of mobile communication devices 30a, 30b, 30c, . . . , 30n, a plurality of mobile communication devices 42a, 42b, 42c, . . . , 42, and a coordinating entity 38. The Internet 18 may host a plurality of resources such as the server 18a.

The mmWave and wireless communication network 10 may comprise a plurality of mmWave and other wireless communication enabled network devices and/or interfaces that enable communication amongst a plurality of devices utilizing wireless communication. In this regard, the mmWave and wireless communication network 10 may comprise one or more mmWave enabled network devices that enable the communication traffic and/or control data via a plurality of mobile communication devices. For example, the mmWave and wireless communication network 10 may comprise the plurality of access points 26a, 26b, . . . , 26n, which may be operable to provide access to mmWave and wireless communication network 10 and/or route communication traffic and/or control data within the mmWave and wireless communication network 10 for one or more of the plurality of mobile communication devices 30a, 30b, 30c, . . . , 30n. The mmWave and wireless communication network 10 may also be operable to provide access to the Internet 18 via the service provider network 14. The mmWave and wireless communication network 10 may also comprise devices that may be operable to communicate via wireless wide area network (WWAN), wireless medium area network (WMAN), wireless local area network (WLAN), wireless personal area network (WPAN) and/or other wireless technologies.

The mmWave and wireless communication network 12 may comprise a plurality of mmWave and other wireless communication enabled network devices and/or interfaces that enable communication amongst a plurality of devices utilizing wireless communication. In this regard, the mmWave and wireless communication network 12 may comprise one or more mmWave enabled network devices that enable the communication traffic and/or control data via a plurality of mobile communication devices. For example, the mmWave and wireless communication network 12 may comprise the plurality of access points 36a, 36b, . . . , 36n, which may be operable to provide access to the mmWave and wireless communication network 12 and/or route communication traffic and/or control data within the mmWave and wireless communication network 12 for one or more of the plurality of mobile communication devices 42a, 42b, 42c, . . . , 42n. The mmWave and wireless communication network 12 may also be operable to provide access to the Internet 18 via the service provider network 16. The mmWave and wireless communication network 12 may also comprise devices that may be operable to communicate via wireless wide area network (WWAN), wireless medium area network (WMAN), wireless local area network (WLAN), wireless personal area network (WPAN) and/or other wireless technologies.

The service provider network 14 may comprise suitable devices and/or interfaces that may enable communication devices, which are communicatively coupled to the mmWave and wireless communication network 10, to access one or more other networks such as the Internet 18 and the mmWave and wireless communication network 12. In this regard, the service provider network 14 may enable the mobile communication devices 30a, 30b, 30c, . . . , 30n to access devices and/or services on the Internet 18. The service provider network 14 may also enable the mobile communication devices 30a, 30b, 30c, . . . , 30n to access the mmWave and wireless communication network 12 and communicate with one or more of the mobile communication devices 42a, 42b, 42c, . . . , 42n. The service provider network 16 may enable the mobile communication devices 42a, 42b, 42c, . . . , 42n to access the mmWave and wireless communication network 10 and communicate with one or more of the mobile communication devices 30a, 30b, 30c, . . . , 30n via the Internet 18 and the service provider network 14 and/or via the gateway 20. The service provider network 14 may comprise, for example, a broadband connectivity (or another distributed mmWave connectivity) to the mmWave and wireless communication network 10. In this regard, for example, the service provider network 14 may comprise a cable service provider, an digital subscriber line (DSL) or variants thereof service provider, a fiber optic service provider, a hybrid fiber coaxial service provider, a WWAN service provider, a WMAN, and/or a satellite service provider The service provider network 16 may comprise suitable devices and/or interfaces that may enable communication devices, which are communicatively coupled to the mmWave and wireless communication network 12, to access one or more other network such as the Internet 18 and the mmWave and wireless communication network 10. In this regard, the service provider network 16 may enable the mobile communication devices 42a, 42b, 42c, . . . , 42n to access devices and/or services on the Internet 18. The service provider network 16 may enable the mobile communication devices 42a, 42b, 42c, . . . , 42n to access the mmWave and wireless communication network 10 and communicate with one or more of the mobile communication devices 30a, 30b, 30c, . . . , 30n via the Internet 18 and the service provider network 14. The service provider network 16 may comprise, for example, a broadband or other high speed connectivity to the mmWave and wireless communication network 12. In this regard, for example, the service provider network 16 may comprise a cable service provider, a digital subscriber line (DSL) or variants hereof service provider, a fiber optic service provider, a hybrid fiber coaxial service provider, a WWAN service provider, a WMAN, and/or a satellite service provider.

The Internet 18 may comprise suitable devices and/or interfaces that enable the interconnection of a plurality of networks and/or devices. In this regard, the Internet 18 may enable the interconnection of the service provider network 14, the service provider network 16, the mmWave and wireless communication network 10, the mmWave and wireless communication network 12.

Each of the plurality of access points 26a, 26b, . . . , 26n may comprise suitable logic, circuitry, interfaces and/or code that may be operable to provide access to the mmWave and wireless communication network 10 for one or more of the mobile communication devices 30a, 30b, 30c, . . . , 30n when they are within operating range of a corresponding one or more of the plurality of access points 26a, 26b, . . . , 26n. In this regard, each of the plurality of access points 26a, 26b, . . . , 26n may comprise a plurality of distributed transceivers such as mmWave transceivers and/or a plurality of antenna arrays that enable communication via one or more mmWave technologies and/or communication protocols. Each of the plurality of access points 26a, 26b, . . . , 26n may also be operable to handle communication of traffic and/or control data among one or more other access points in the mmWave and wireless communication network 10, the coordinating entity 28 and/or the gateway 20. In some embodiments of the invention, each of the plurality of access points 26a, 26b, . . . , 26n may communicate with the coordinating entity 28 in order to handle the routing and/or processing of data for one or more of the mobile communication devices 30a, 30b, 30c, . . . , 30n.

Each of the plurality of access points 36a, 36b, . . . , 36n may comprise suitable logic, circuitry, interfaces and/or code that may be operable to provide access to the mmWave and wireless communication network 12 for one or more of the mobile communication devices 42a, 42b, 42c, . . . , 42n when they are within operating range of a corresponding one or more of the plurality of access points 36a, 36b, . . . , 36n. In this regard, each of the plurality of access points 36a, 36b, . . . , 36n may comprise a plurality of distributed transceivers such as mmWave transceivers and/or one or more antenna arrays that enable communication via one or more mmWave technologies and/or communication protocols. Each of the plurality of access points 36a, 36b, . . . , 36n may also be operable to handle communication of traffic and/or control data among one or more other access points in the mmWave and wireless communication network 12, the coordinating entity 38 and/or the gateways 22, 24. In some embodiments of the invention, each of the plurality of access points 36a, 36b, . . . , 36n may communicate with the coordinating entity 38 in order to handle the routing and/or processing of data for one or more of the mobile communication devices 42a, 42b, 42c, . . . , 42n.

The coordinating entity 28 may comprise suitable logic, circuitry, interfaces and/or code that may be operable to control, coordinate and/or manage the handling and routing of traffic and/or control data within the mmWave and wireless communication network 10. The coordinating entity 28 may be operable to control the type and/or amount of links, the number of distributed transceivers, configuration of the distributed transceivers' interfaces and/or components including RF front ends and/or antenna arrays, which may be utilized by one or more of the access points 26a, 26b, . . . , 26n to handle traffic for one or more of the mobile communication devices 30a, 30b, 30c, . . . , 30n. The coordinating entity 28 may be operable to control the allocation and de-allocation of bandwidth to facilitate communication of traffic in order to provide and/or guarantee a particular class of service (CoS) and/or Quality of Service (QoS) for the mobile communication devices 30a, 30b, 30c, . . . , 30n. The coordinating entity 28 may be operable to coordinate amongst the gateway 20 and/or one or more of the access points 26a, 26b, . . . , 26n in order to route traffic to and from the gateway 20 and the mobile communication devices 30a, 30b, 30c, . . . , 30n. Although the coordinating entity 28 is illustrated as a separate entity from the gateway 20, and the access points 26a, 26b, . . . , 26n, the invention is not necessarily limited in this regard. Accordingly, the coordinating entity 28 may be integrated in the gateway 20 or in one of the access points 26a, 26b, . . . , 26n. In some embodiments of the invention, the functionality of the coordinating entity 28 may be split amongst a plurality of devices such as two or more of the gateway 20, and/or the access points 26a, 26b, . . . , 26n.

The coordinating entity 38 may comprise suitable logic, circuitry, interfaces and/or code that may be operable to control, coordinate and/or manage the handling and routing of traffic and/or control data within the mmWave and wireless communication network 12. The coordinating entity 38 may be operable to control the type and/or amount of links, communication protocols, the number of distributed transceivers, configuration of the distributed transceivers' interfaces and/or components including RF front ends and/or antenna arrays, which may be utilized by one or more of the access points 36a, 36b, . . . , 36n to handle traffic for one or more of the mobile communication devices 42a, 42b, 42c, . . . , 42n. The coordinating entity 38 may be operable to control the allocation and de-allocation of bandwidth to facilitate communication of traffic in order to provide and/or guarantee a particular class of service (CoS) and/or Quality of Service (QoS) for the mobile communication devices 42a, 42b, 42c, . . . , 42n. The coordinating entity 38 may be operable to coordinate amongst the gateways 22, 24 and/or one or more of the access points 36a, 36b, . . . , 36n in order to route traffic to and from the gateways 22, 24 and the mobile communication devices 42a, 42b, 42c, . . . , 42n. Although the coordinating entity 38 is illustrated as a separate entity from the gateways 22, 24, and the access points 36a, 36b, . . . , 36n, the invention is not necessarily limited in this regard. Accordingly, the coordinating entity 38 may be integrated in one of the gateways 22, 24 or in one of the access points 36a, 36b, . . . , 36n. In some embodiments of the invention, the functionality of the coordinating entity 38 may be split amongst a plurality of devices such as two or more of the gateways 20, 24 and/or the access points 36a, 36b, . . . , 36n.

Each of the plurality of mobile communication devices 30a, 30b, 30c, . . . , 30n may comprise suitable logic, circuitry, interfaces and/or code that may be operable to communicate with the service provider network 14 via the mmWave and wireless communication network 10. In this regard, each of the plurality of mobile communication devices 30a, 30b, 30c, . . . , 30n may comprise a plurality of distributed transceivers such as mmWave transceiver devices that may be operable to communicate with the access points 26a, 26b, . . . , 26n in the mmWave and wireless communication network 10. The plurality of mobile communication devices 30a, 30b, 30c, . . . , 30n may be collectively referenced as mobile communication devices 30. Each of the plurality of mobile communication devices 30a, 30b, 30c, . . . , 30n may be operable to communicate utilizing, for example, 60 GHz wireless standard, WirelessHD, WiGig, WiFi IEEE 802.11ad, and/or other mmWave technology or standard. One or more of the access points 26a, 26b, . . . , 26n, the coordinating entity 28, and/or the gateway 20 may be operable to control and/or route traffic to and/or from the one or more of the mobile communication devices 30a, 30b, 30c, . . . , 30n. In addition to communicating utilizing mmWave technologies, each of the plurality of mobile communication devices 30a, 30b, 30c, . . . , 30n may comprise one or more transmitter and/or receiver devices, which may be operable to communicate utilizing technologies such as, for example, wireless personal area network (WPAN), a wireless local area network (WLAN), wireless medium area network (WMAN) and/or wireless wide area network (WWAN) technologies. For example, one or more of the plurality of mobile communication devices 30a, 30b, 30c, . . . , 30n may comprise one or more transmitter and/or receiver devices, which may be operable to communicate utilizing WiFi, WiMax, Bluetooth, ZigBee, Bluetooth Low Energy (BLE), 3GPP, 4G LTE, WiMAX or other technologies. In this regard, radios such as mmWave radios may be utilized at very high carrier frequencies for high throughput wireless communications.

The plurality of mobile communication devices 42a, 42b, 42c, . . . , 42n may be communicatively coupled to the mmWave and wireless communication network 12. The plurality of mobile communication devices 42a, 42b, 42c, . . . , 42n may be collectively referenced as mobile communication devices 42. Each of the plurality of mobile communication devices 42a, 42b, 42c, . . . , 42n may be operable to communicate utilizing, for example, 60 GHz wireless standard, WirelessHD, WiGig, WiFi IEEE 802.11ad, and/or other mmWave technology or standard. The plurality of mobile communication devices 42a, 42b, 42c, . . . , 42n may be communicatively coupled to the mmWave and wireless communication network 12. In some exemplary embodiments of the invention, the mobile communication device 42a may comprise a tablet, the mobile communication device 42b may comprise a Smartphone, the mobile communication device 42cc may comprise a personal computer PC, laptop or ultrabook, and the mobile communication device 42n may comprise a television.

The gateway 20 may comprise suitable logic, circuitry, interfaces and/or code that are operable to process and/or route traffic and/or control data between the service provider network 14 and the mmWave and wireless communication network 10. In this regard, the gateway 20 may be operable to handle the processing and/or routing of traffic and/or control data between the service provider network 14 and one or more of the access points 26a, 26b, . . . , 26n and/or the coordinating entity 28 for one or more of the plurality of mobile communication devices 30a, 30b, 30c, . . . , 30n. The gateway 20 may comprise, for example, a modulation and/or demodulation (modem) device that may be operable to provide modulation and/or demodulation of the information that is communicated between the service provider network 14 and the mmWave and wireless communication network 10. For example, the gateway 20 may comprise a cable modem, a DSL modem, a HFC modem, a cable set top box (STB), a satellite STB and/or other similar type of device. In general, the gateway 20 may be operable to handle any technology that may be utilized by one or more of the cable service provider, the digital subscriber line (DSL) service provider, the fiber optic service provider, the hybrid fiber coaxial (HFC) service provider, the WWAN service provider, the WMAN, and/or the satellite service provider. In some embodiments of the invention, the gateway 20 may comprise server functionality. The gateway 20 may also enable communication amongst one or more of the mobile communication devices 30a, 30b, 30c, . . . , 30n and one or more of the mobile communication devices 42a, 42b, 42c, . . . , 42n via the mmWave and wireless communication network 10 and the service provider network 14 and/or via the service providers 14, 16 and the Internet 18.

The gateway 22 may comprise suitable logic, circuitry, interfaces and/or code that are operable to process and/or route traffic and/or control data between the service provider network 14 and the mmWave and wireless communication network 12. In this regard, the gateway 22 may be operable to handle the processing and/or routing of traffic and/or control data between the service provider network 14 and one or more of the access points 36a, 36b, . . . , 36n and/or the coordinating entity 38 for one or more of the plurality of mobile communication devices 42a, 42b, 42c, . . . , 42n. The gateway 22 may comprise, for example, a modulation and/or demodulation (modem) device that may be operable to provide modulation and/or demodulation of the information that is communicated between the service provider network 14 and the mmWave and wireless communication network 12. For example, the gateway 22 may comprise a cable modem, a DSL modem, a HFC modem, a cable set top box (STB), a satellite STB and/or other similar type of device. In general, the gateway 22 may be operable to handle any technology that may be utilized by one or more of the cable service provider, the digital subscriber line (DSL) service provider, the fiber optic service provider, the hybrid fiber coaxial (HFC) service provider, the WWAN service provider, the WMAN, and/or the satellite service provider. In some embodiments of the invention, the gateway 22 may comprise a server functionality. The gateway 22 may also enable communication amongst one or more of the mobile communication devices 30a, 30b, 30c, . . . , 30n and one or more of the mobile communication devices 42a, 42b, 42c, . . . , 42n via the mmWave and wireless communication networks 10, 12 and the service provider network 14 and/or via the service providers 14, 16 and the Internet 18.

The gateway 24 may comprise suitable logic, circuitry, interfaces and/or code that are operable to process and/or route traffic and/or control data between the service provider network 16 and the mmWave and wireless communication network 12. In this regard, the gateway 24 may be operable to handle the processing and/or routing of traffic and/or control data between the service provider network 16 and one or more of the access points 36a, 36b, . . . , 36n and/or the coordinating entity 38 for one or more of the plurality of mobile communication devices 42a, 42b, 42c, . . . , 42n. The gateway 24 may comprise, for example, a modulation and/or demodulation (modem) device that may be operable to provide modulation and/or demodulation of the information that is communicated between the service provider network 16 and the mmWave and wireless communication network 12. For example, the gateway 24 may comprise a cable modem, a DSL modem, a HFC modem, a cable set top box (STB), a satellite STB and/or other similar type of device. In general, the gateway 24 may be operable to handle any technology that may be utilized by one or more of the cable service provider, the digital subscriber line (DSL) service provider, the fiber optic service provider, the hybrid fiber coaxial (HFC) service provider, the WWAN service provider, the WMAN, and/or the satellite service provider. In some embodiments of the invention, the gateway 24 may comprise server functionality. The gateway 24 may also enable communication amongst one or more of the mobile communication devices 30a, 30b, 30c, . . . , 30n and one or more of the mobile communication devices 42a, 42b, 42c, . . . , 42n via the mmWave and wireless communication networks 10, 12, the service provider networks 14, 16 and the Internet 18.

In operation, each of the mobile communication devices 30a, 30b, 30c, . . . , 30n, the mobile communication devices 42a, 42b, 42c, . . . , 42n, the access points 26a, 26b, . . . , 26n and/or the access points 36a, 36b, . . . , 36n may be operable to dynamically configure its distributed transceivers and/or antenna arrays to operate based on various factors. Exemplary factors comprise link throughput/reliability requirements and/or budgets, spectrum availability, propagation conditions, location of reflectors or refractors in the environment, geometry of the environment, positions of the transmitter/receivers, link quality, device capabilities, device locations, usage of resources, resource availability, target throughput, application QoS requirements and/or traffic types.

The geometry of the environment may include the presence of naturally reflective and/or refractive surfaces and/or the presence of obstructive elements in the environment. A processor in each of the mobile communication devices 30a, 30b, 30c, . . . , 30n, the mobile communication devices 42a, 42b, 42c, . . . , 42n, the access points 26a, 26b, . . . , 26n and/or the access points 36a, 36b, . . . , 36n may be operable to dynamically configure and coordinate operation of the distributed transceivers and/or antenna arrays to operate in different modes based on the different factors. Exemplary factors may comprise, for example, propagation environment conditions, link quality, device capabilities, device locations, usage of resources, resource availability, target throughput, and application QoS requirements.

In various embodiments of the invention, a mobile communication device that has data to be transmitted may dynamically sense the environment to determine the current characteristics of the environment. Based on the sensing and/or on one or more of the factors above, the mobile communication device that has data to be transmitted may be operable to configure its transmitter and/or antenna arrays to spread and transmit a narrow beam in one or more directions, where reflectors, refractors, naturally reflecting elements and/or naturally refractive elements may create multiple paths to a receiving mobile communication device. Each communication path may comprise a different frequency, polarization, bandwidth, protocol, and/or coding thereby providing link robustness. The transmitter in a transmitting mobile communication device may be operable to use the same frequency channel or different frequency channels to transmit the same data stream or separate data streams.

In some embodiments of the invention, the coordinating entities 28, 38 may be operable to coordinate the configuration of the distributed transceivers and/or antenna arrays in one or more of the mobile communication devices 30a, 30b, 30c, . . . , 30n, the mobile communication devices 42a, 42b, 42c, . . . , 42n, the access points 26a, 26b, . . . , 26n and/or the access points 36a, 36b, . . . , 36n. In this regard, the coordinating entities 28, 38 may be operable to dynamically collect information from one or more of the mobile communication devices 30a, 30b, 30c, . . . , 30n, the mobile communication devices 42a, 42b, 42c, . . . , 42n, the access points 26a, 26b, . . . , 26n and/or the access points 36a, 36b, . . . , 36n. Based on this collected information and/or one or more environmental conditions, the coordinating entities 28, 38 may aggregate the collected information and determine an optimal configuration for transmitters, receivers and/or antenna array elements in one or more of the mobile communication devices 30a, 30b, 30c, . . . , 30n, the mobile communication devices 42a, 42b, 42c, . . . , 42n, the access points 26a, 26b, . . . , 26n and/or the access points 36a, 36b, . . . , 36n. The coordinating entities 28, 38 may communicate the determined optimal configuration for the transmitters, receivers and/or antenna array elements in the corresponding mobile communication devices 30a, 30b, 30c, . . . , 30n, the mobile communication devices 42a, 42b, 42c, . . . , 42n, the access points 26a, 26b, . . . , 26n and/or the access points 36a, 36b, . . . , 36n. The corresponding mobile communication devices 30a, 30b, 30c, . . . , 30n, the mobile communication devices 42a, 42b, 42c, . . . , 42n, the access points 26a, 26b, . . . , 26n and/or the access points 36a, 36b, . . . , 36n may then configure their transmitters, receivers and/or antenna array elements accordingly. The coordinating entities 28, 38 may be separate dedicated hardware/software units performing the coordinating functions. Coordinating entities 28, 38 may be integrated into another entity in the network and reuse its hardware/software resources (e.g., embedded in access points 36a, 36b). Furthermore, coordinating entities 28, 38 may be implemented as all-software entities running on a generic processor or a remote processor. Furthermore, the functions of coordinating entities 28, 38 may be distributed over several entities in the network.

The reference to 60 GHz wireless connectivity is intended to include all mmWave frequency bands (any carrier frequency above 10 GHz, e.g., 38.6-40 GHz, 59-67 GHz, 71-76 GHz, 92-95 GHz bands). Furthermore, all or a subset of embodiments are applicable to sub-10 GHz carrier frequency operations as well (e.g., 5 GHz and 2.4 GHz ISM bands and UWB 3-10 GHz bands).

Figure 2:
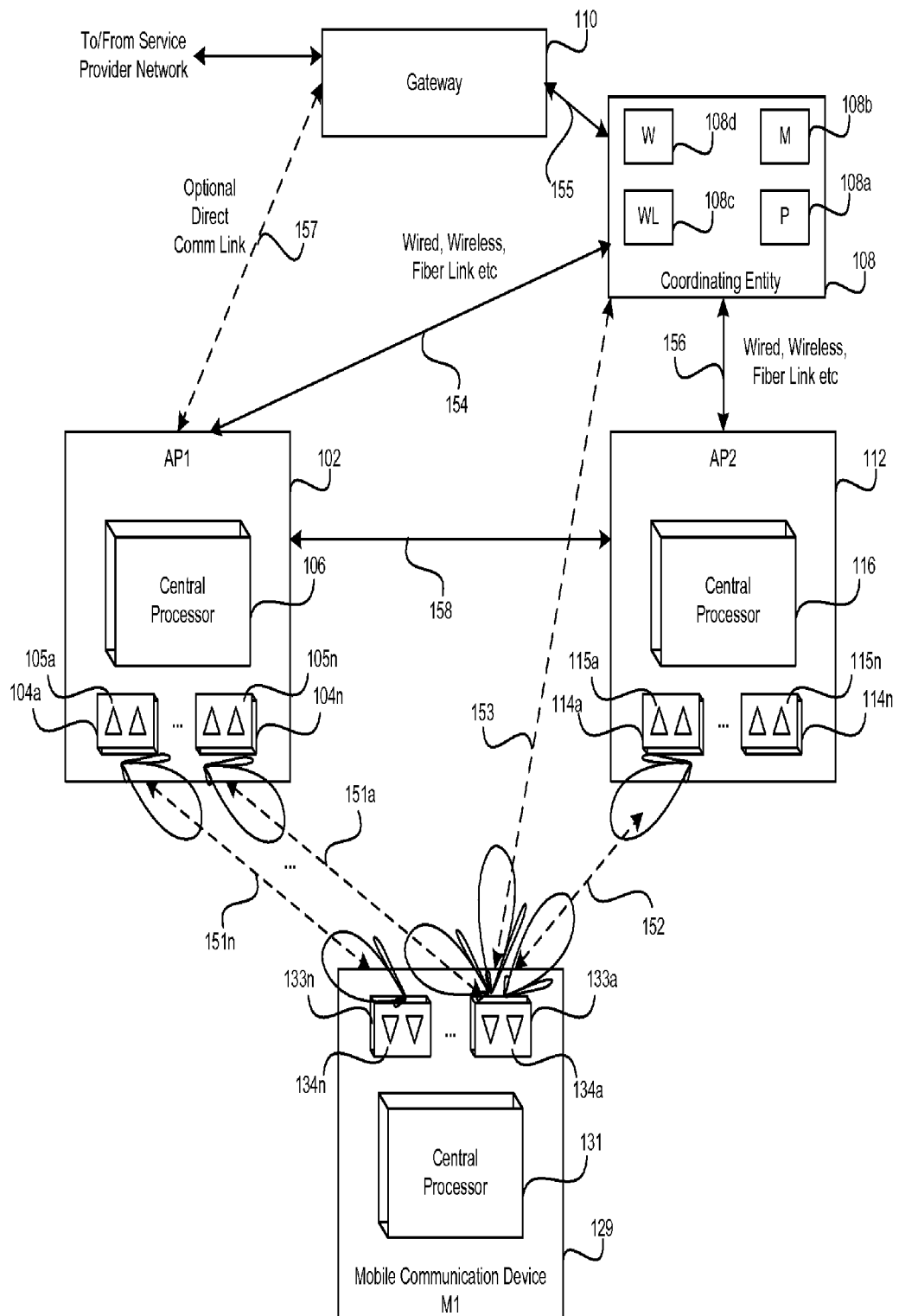
FIG. 2 is a block diagram illustrating distributed transceivers utilized for wireless communication in access points and a mobile communication device, in accordance with an exemplary embodiment of the invention.

FIG. 2 is a block diagram illustrating distributed transceivers utilized for wireless communication in access points and a mobile communication device in accordance with an exemplary embodiment of the invention. Referring to FIG. 2, there are shown access points 102, 112, a mobile communication device 129, a coordinating entity 108 and a gateway 110. The access points 102, 112 are also referenced as AP1 and AP2, respectively. The mobile communication device 129 is also referenced as M1. Although a single mobile communication device 129 is shown, the invention is not necessarily limited in this regard. Accordingly, a plurality of mobile and/or non-mobile communication devices may also be present without departing from the spirit and/or scope of the invention.

The access point 102 (AP1) may be substantially similar to any of the access points 26a, 26b, . . . , 26n and/or the access points 36a, 36b, . . . , 36n, which are shown and described with respect to FIG. 1, for example. Notwithstanding, as shown in FIG. 2, the access point 102 (AP1) may comprise a central processor 106 and a plurality of distributed transceiver devices 104a, . . . , 104n. The distributed transceiver devices 104a, . . . , 104n may comprise a corresponding plurality of antenna arrays 105a, . . . , 105n. The access point 102 may be communicatively coupled to the coordinating entity 108 via a communication link 154, which may comprise a wired, wireless, optical and/or other type of communication link. The access point 102 may also be communicatively coupled to the access point 112 via a communication link 158, which may comprise a wired, wireless, optical and/or other type of communication link. In accordance with some embodiments of the invention, the access point 102 may optionally be coupled to the gateway 110 via an optional direct communication link 157, which may comprise a wired, wireless, optical, HFC, and/or other type of direct communication link.

The plurality of distributed transceiver devices 104a, . . . , 104n in the access point 102 may comprise suitable logic, circuitry, interfaces and/or code that may be operable to handle communication utilizing WPAN, WLAN, WMAN, WWAN and/or mmWave technologies, standards and/or protocols.

Each of the plurality of antenna arrays 105a, . . . , 105n in the plurality of distributed transceiver devices 104a, . . . , 104n may comprise suitable logic, circuitry, interfaces and/or code that may be operable to communicate wireless signals. For example, each of the plurality of antenna arrays 105a, . . . , 105n in the plurality of distributed transceiver devices 104a, . . . , 104n may be operable to transmit and/or receive wireless signals corresponding to the WPAN, WLAN, WMAN, WWAN and/or mmWave technologies, standards and/or protocols.

The central processor 106 in the access point 102 may comprise suitable logic, circuitry, interfaces and/or code that may be operable to control and/or manage operation of the access point 102. In this regard, the central processor 106 may be operable to configure and/or manage the communication links that are handled by the access point 102. For example, the central processor 106 may be operable to configure and/or manage the communication links 154, 158, and 151a, . . . , 151n. The central processor 106 may be operable to configure and/or manage the plurality of distributed transceivers 104a, . . . , 104n and the corresponding antenna arrays 105a, . . . , 105n, which are in the access point 102. The central processor 106 may be operable to monitor and/or collect information from various devices within the access point 102 and communicate data associated with the monitoring and/or collecting to the coordinating entity 108. The coordinating entity 108 may utilize the resulting communicated data to configure the operation of one or both of the access points 102 and 112. For example, the coordinating entity 108 may aggregate resulting data received from the access points 102 and 112 and utilize the corresponding aggregated data to configure the plurality of distributed transceivers 104a, . . . , 104n and/or 114a, . . . , 114n, respectively, and/or the corresponding antenna arrays 105a, . . . , 105n and/or 115a, . . . , 115n to improve the communication links 151a, . . . , 151n and/or 152. The coordinating entity 108 may also utilized the corresponding aggregated data to inform the mobile communication device 129 how to configure, for example, its plurality of distributed transceivers 133a, . . . , 133n and/or antenna arrays 134a, . . . , 134n, respectively. The central processor 106 may operate and/or control the distributed transceivers 104a, . . . , 104n in any of the distributed modes of operation such as spatial multiplexing, spatial diversity, frequency multiplexing, frequency diversity, and MIMO processing, according to embodiments in U.S. application Ser. Nos. 13/473,096, 13/473,144, 13/473,105, 13/473,160, 13/473, 180, 13/473,113, 13/473,083, each of which is hereby incorporated by reference in its entirety.

The access point 112 (AP2) may be substantially similar to any of the access points 26a, 26b, . . . , 26n and/or the access points 36a, 36b, . . . , 36n, which are shown and described with respect to FIG. 1, for example. Notwithstanding, as shown in FIG. 2, the access point 112 (AP2) may comprise a central processor 116 and a plurality of distributed transceiver devices 114a, . . . , 114n. The plurality of distributed transceiver devices 114a, . . . , 114n may comprise a corresponding plurality of antenna arrays 115a, . . . , 115n. The access point 112 may be communicatively coupled to the coordinating entity 108 via a communication link 156, which may comprise a wired, wireless, optical and/or other type of communication link. The access point 112 may also be communicatively coupled to the access point 102 via the communication link 158, which may comprise a wired, wireless, optical and/or other type of communication link. Although not shown, the access point 112 may also be communicatively coupled to the gateway 110 via a wired, wireless, optical and/or other type of communication link.

The plurality of distributed transceiver devices 114a, . . . , 114n in the access point 112 may comprise suitable logic, circuitry, interfaces and/or code that may be operable to handle communication utilizing WPAN, WLAN, WMAN, WWAN and/or mmWave technologies, standards and/or protocols.

Each of the plurality of antenna arrays 115a, . . . , 115n in the plurality of distributed transceiver devices 114a, . . . , 114n may comprise suitable logic, circuitry, interfaces and/ or code that may be operable to communicate wireless signals. For example, each of the plurality of antenna arrays 115a, . . . , 115n in the plurality of distributed transceiver devices 114a, . . . , 114n may be operable to transmit and/or receive wireless signals corresponding to the WPAN, WLAN, WMAN, WWAN and/or mmWave technologies, standards and/or protocols.

The central processor 116 in the access point 112 may comprise suitable logic, circuitry, interfaces and/or code that may be operable to control and/or manage operation of the access point 112. In this regard, the central processor 116 may be operable to configure and/or manage the communication links that are handled by the access point 112. For example, the central processor 116 may be operable to configure and/or manage the communication links 156, 158, and 152. The central processor 106 may be operable to configure and/or manage the plurality of distributed transceivers 114a, . . . , 114n and the corresponding antenna arrays 115a, . . . , 115n, which are in the access point 112. The central processor 116 may be operable to monitor and/or collect information from various devices within the access point 112 and communicate data associated with the monitoring and/or collecting to the coordinating entity 108. The coordinating entity 108 may utilize the resulting communicated data to configure the operation of one or both of the access points 102 and 112. For example, the coordinating entity 108 may aggregate resulting data received from the access points 102, 112 and utilize the corresponding aggregated data to configure the plurality of distributed transceivers 114a, . . . , 114n and/or the plurality of distributed transceivers 104a, . . . , 104n, and/or the corresponding antenna arrays 115a, . . . , 115n and/or 105a, . . . , 105n, respectively, to improve the communication links 152 and/or 151a, . . . , 151n. The coordinating entity 108 may also utilize the corresponding aggregated data to inform the mobile communication device 129 how to configure, for example, its plurality of distributed transceivers 133a, . . . , 133n and/or antenna arrays 134a, . . . , 134n.

The mobile communication device 129 (M1) may be substantially similar to any of the mobile communication devices 30a, 30b, 30c, . . . , 30n, the mobile communication devices 42a, 42b, 42c, . . . , 42n, which are shown and described with respect to FIG. 1, for example. Notwithstanding, as shown in FIG. 2, the mobile communication device 129 may comprise a central processor 131 and a plurality of distributed transceiver devices 133a, . . . , 133n. The plurality of distributed transceiver devices 133a, . . . , 133n may comprise a corresponding plurality of antenna arrays 134a, . . . , 134n. Although not shown, the mobile communication device 129 may comprise one or more transmitters, receivers and/or transceivers that may be operable to handle a plurality of wired and/or wireless communication technologies, standards and/or protocols. For example, the one or more transmitters, receivers and/or transceivers may be operable to handle IEEE 802.3, WPAN, WLAN, WMAN, WWAN and/or mmWave technologies, standards and/or protocols.

The central processor 131 in the mobile communication device 129 may comprise suitable logic, circuitry, interfaces and/or code that may be operable to control and/or manage operation of the mobile communication device 129. In this regard, the central processor 131 may be operable to configure and/or manage the communication links for the mobile communication device 129. For example, the central processor 131 may be operable to configure and/or manage the communication links 153, 151a, . . . , 151n, and 152. The central processor 131 may be operable to configure and/or manage the plurality of distributed transceivers 133a, . . . , 133n and the corresponding antenna arrays 134a, . . . , 134n, which are in the mobile communication device 129. The central processor 131 may be operable to monitor and/or collect information from various devices, for example, other transmitters, receivers and/or transceivers, within the mobile communication device 129 and communicate data associated with the monitoring and/or collecting to the coordinating entity 108. The coordinating entity 108 may utilize the resulting communicated data to configure the operation of one or both of the access points 102 and 112. For example, the coordinating entity 108 may aggregate resulting data received from the mobile communication device 129 and/or the access points 102, 112 and utilize the corresponding aggregated data to configure the plurality of distributed transceivers 114a, . . . , 114n and/or the plurality of distributed transceivers 104a, . . . , 104n, and/or the corresponding antenna arrays 115a, . . . , 115n and/or 105a, . . . , 105n, respectively, to improve the communication links 152, 153, and/or 151a, . . . , 151n. The coordinating entity 108 may also utilize the corresponding aggregated data to inform the mobile communication device 129 how to configure, for example, its plurality of distributed transceivers 133a, . . . , 133n and/or antenna arrays 134a, . . . , 134n. The central processor 131 may operate the distributed transceivers 133a, . . . , 133n in any of the distributed modes of operation such as spatial multiplexing, spatial diversity, frequency multiplexing, frequency diversity, and MIMO processing according to embodiments in U.S. application Ser. No. 13/473,096, 13/473,144, 13/473,105, 13/473,160, 13/473,180, 13/473,113, 13/473,083, which are hereby incorporated herein my reference in its entirety.

Each of the plurality of distributed transceiver devices 133a, . . . , 133n may comprise suitable logic, circuitry, interfaces and/or code that may be operable to handle WPAN, WLAN, WMAN, WWAN and/or mmWave technologies, standards and/or protocols.

Each of the plurality of antenna arrays 134a, . . . , 134n in the plurality of distributed transceiver devices 133a, . . . , 133n may comprise suitable logic, circuitry, interfaces and/or code that may be operable to communicate wireless signals. For example, each of the plurality of antenna arrays 134a, . . . , 134n in the plurality of distributed transceiver devices 133a, . . . , 133n may be operable to transmit and/or receive wireless signals corresponding to the WPAN, WLAN, WMAN, WWAN and/or mmWave technologies, standards and/or protocols.

The coordinating entity 108 may be substantially similar to any of the coordinating entities 28, 38, which are shown and described with respect to FIG. 1, for example. Notwithstanding, as shown in FIG. 2, the coordinating entity 108 may comprise a processor 108a, memory 108b, a wireless interface 108c and a wired interface 108d. Although not shown, the coordinating entity 108 may comprise other interfaces such as an optical interface, a HFC interface and/or other communication interfaces. The coordinating entity 108 may be communicatively coupled to the access points 102 (AP1), 112 (AP2) via the communication links 154, 156, respectively. The communication links 154, 156 may comprise wired, wireless (cellular, WLAN, WiMax, LTE), optical, HFC, point-to-point, and/or other types of communication links. The link between the coordinating entity 108 and access points 102, 112 may be utilized to transport both control data (settings, reports, configurations) as well as traffic comprising data streams intended for the user of mobile communication device 129.

The coordinating entity 108 may utilize the communication links 154, 156 to handle different data traffic categories. For example, the communication links 154 and/or 156 may be utilized to transport control information and/or commands between the coordinating entity 108 and the access point 102 and/or access point 112, respectively. The communication links 154 and/or 156 may be utilized to transport information bits intended for and/or generated by the mobile communication device 129. The communication links 154 and/or 156 may be utilized to transport raw analog to digital conversion (ADC) and/or digital to analog conversion (DAC) data between the access points 102, 112 and the central processors 106, 116 in the access points 102, 112, respectively. In this mode of operation, in order to enhance performance, communication and/or signal processing operations required to decode data (e.g., equalization, MIMO processing, demodulation, channel decoding) may be performed jointly at coordinating entity 108 on the combination of ADC samples received from access points 102 and 112.

The coordinating entity 108 may comprise suitable logic, circuitry, interfaces and/or code that may be operable to coordinate and/or manage operation of the access points 102, 112, the gateway 110 and/or the mobile communication device 129. For example, the coordinating entity 108 may be operable to coordinate operation of the access points 102, 112 in order to maximize and/or optimize the system performance within a mmWave and wireless communication network such as the mmWave and wireless communication networks 10, 12. The coordinating entity may be located in the access point 102, the access point 112, the gateway 110, or in a separate device location. In some embodiments of the invention, the functions performed by the access point 112 may be split among a plurality of devices. For example, one or more of the functions performed by the coordinating entity 108 may be split amongst two or more of the access point 102, the access point 112 and/or the gateway 110. In some embodiments of the invention, the coordinating entity 108 may reside in a remote location and/or may be hosted remotely.

The coordinating entity 108 may be operable to manage the combination of transceiver resources within the access points 102, 112 and maximize or optimize the performance of the corresponding wireless links 151a, . . . , 151n and 152 from the combination of the plurality of distributed transceivers 104a, . . . , 104n and 114a, . . . , 114n in the access points 102, 112, respectively, to the mobile communication device 129. In accordance with various embodiments of the invention, the coordinating entity 108 may be operable to provide coordinate operation of the plurality of distributed transceivers 104a, . . . , 104n and 114a, . . . , 114n in the access points 102, 112, respectively, to provide, for example, spatial multiplexing, spatial diversity, frequency diversity, frequency multiplexing, multiple input multiple output (MIMO) processing. In this regard, the coordinating entity 108 may be operable to combine or aggregate transceiver resources in the access points 102, 112 in order to program or configure the resulting pooled transceiver resources to provide better performance over the communication links 151a, . . . , 151n and 152. The coordinating entity 108 may be operable to program or configure the resulting pooled transceiver resources to provide different levels of coordination based on system restrictions and/or capabilities and/or based on channel characteristics, QoS, CoS, traffic type and so on.

U.S. application Ser. No. 13/473,160, which was filed May 16, 2012 discloses details of a method and system for providing diversity in a network of distributed transceivers with array processing and is hereby incorporated herein by reference in its entirely.

U.S. application Ser. No. 13/473,180, which was filed May 16, 2012 discloses details of a method and system that utilizes multiplexing in a network of distributed transceivers with array processing and is hereby incorporated herein by reference in its entirely.

U.S. application Ser. No. 13/473,113, which was filed May 16, 2012 discloses details of a method and system that utilizes MIMO communication in a network of distributed transceivers with array processing and is hereby incorporated herein by reference in its entirely.

The coordinating entity 108 may be operable to determine the optimal beamforming patterns and modes of operation, which may be best for the access point 102, the access point 112 and/or the mobile communication device 129. Exemplary modes of operation may comprise spatial multiplexing, spatial diversity and frequency diversity. Once the coordinating entity 108 determines the beamforming patterns and/or modes of operation, the coordinating entity 108 may be operable to communicate corresponding information to the access point 102, the access point 112 and/or the mobile communication device 129. The access point 102, the access point 112 and/or the mobile communication device 129 may utilize the corresponding information to configure its plurality of distributed transceivers and/or antenna arrays accordingly. The coordinating entity 108 may be operable to configure the beam patterns for the access point 102 by taking into account the beam patterns that may be utilized by the access point 112 and/or the mobile communication device 129 in order to mitigate cross interference between the data streams for the access point 102 and the access point 112.

The processor 108a in the coordinating entity 108 may comprise suitable logic, circuitry, interfaces and/or code that may be operable to execute the operations of the coordinating entity 108.

The memory 108b in the coordinating entity 108 may comprise suitable logic, circuitry, interfaces and/or code that may be operable to store operating data, control information and/or data, which may be utilized by the coordinating entity 108.

The wireless interface 108c in the coordinating entity 108 may comprise suitable logic, circuitry, interfaces and/or code that may be operable to handle communication between the coordinating entity 108 and the gateway 110, the access point 102 and/or the access point 112. In some embodiments of the invention, in instances where the mobile communication device 129 may be within operating range of the coordinating entity 108, the mobile communication device 129 may be operable to communicate with the coordinating entity 108 via, for example, the wireless interface 108c.

The wired interface 108d in the coordinating entity 108 may comprise suitable logic, circuitry, interfaces and/or code that may be operable to handle communication between the coordinating entity 108 and the gateway 110, the access point 102 and/or the access point 112.

The gateway 110 may be substantially similar to any of the gateways 20, 22, 24, which are shown and described with respect to FIG. 1, for example. Notwithstanding, as shown in FIG. 2, the gateway 110 may be communicatively coupled to the coordinating entity 108 via the link 155. The link 155 may comprise a wired and/or wireless communication link. In this regard, the wired interface 108d and/or the wireless interface 108c may be operable to handle communication via the communication link 155. The gateway 110 may be coupled to one or more service provider networks, for example, the service provider networks 14, 16, which are illustrated in and described with respect to FIG. 1, for example. In accordance with some embodiments of the invention, the gateway 110 may optionally be coupled to the access point 102 via an optional direct communication link 157. The optional direct communication link 157 may comprise a wired, wireless, optical, HFC, and/or other type of direct communication link.

As illustrated in FIG. 2, the distributed transceiver devices 104a, . . . , 104n and 114a, . . . , 114n are integrated in separate physical devices such as the access points 102, 112, respectively. The access point 102 comprises a plurality of distributed transceivers 104a, . . . , 104n and the access point 112 comprises a plurality of access points 114a, . . . , 114n. Although the plurality of distributed transceiver devices 104a, . . . , 104n and 114a, . . . , 114n are shown as integrated in separate physical devices such as the access points 102, 112, respectively, the invention is not necessarily limited in this regard, accordingly, in some embodiments of the invention, the plurality of distributed transceiver devices 104a, . . . , 104n and 114a, . . . , 114n may be integrated in a single physical device such as the access point 102 or the access point 112.

In some embodiments of the invention, the coordinating entity 108 may be operable to coordinate the operation of the access point 102 and the access point 112 as a single virtual access point entity. In other words, the coordinating entity 108 may combine the plurality of distributed transceiver devices 104a, ..., 104n and 114a, ..., 114n and treat the combined plurality of distributed transceiver devices 104a, ..., 104n and 114a, ..., 114n as the single virtual access point entity. In this regard, the mobile communication device 129 may be operable to access one or more of the combined plurality of distributed transceiver devices 104a, ..., 104n and 114a, ..., 114n in the single virtual access point entity without knowledge that the combined plurality of distributed transceiver devices 104a, ..., 104n and 114a, ..., 114n are in separate physical access points, namely, access points 102, 112. The combined plurality of distributed transceiver devices 104a, ..., 104n and 114a, ..., 114n in the single virtual access point entity may provide, for example, more reliable service and higher throughput or bandwidth to the mobile communication device 129 than one or both of the access points 102, 112 since the resulting communication resources are coordinated as one by the coordinating entity 108.

The coordinating entity 108 may be operable to dynamically monitor and/or analyze the link quality (e.g., SNR or capacity) between the different transceivers within the access points 102, 112 and the mobile communication device 129. The link quality may be determined based on the signal to noise ratio (SNR), signal to interference noise ratio (SINR), carrier to noise interference ratio (CINR), link capacity, throughput, bit error rate (BER), packet error rate (PER) and/or other parameters. The coordinating entity 108 may be operable to allocate, de-allocate, reallocate, distribute and/or redistribute the overall capacity and/or throughput target to optimize communication by the access points 102, the access point 112 and/or the mobile communication device 129. In this regard, the coordinating entity 108 may be operable to communicate information to the central processors 106, 116 and the central processors 106, 116 may utilize this information to configure the corresponding plurality of distributed transceivers 104a, ..., 104n and/or 114a, ..., 114n and/or the antenna arrays 105a, ..., 105n and/or 115a, ..., 115n in the access point 102 and access point 112, respectively.

In an exemplary embodiment of the invention, in instances where a transceiver, for example, transceiver 104a, within the access point 102 may experience a good channel condition (high SNR), a higher throughput data stream may be passed through the transceiver 104a for communication with the mobile mmWave enable communication device 129.

In various embodiments of the invention, capacity distribution techniques such as water filling may also be utilized to optimize communication. In the water filling method, overall throughput to mobile mmWave enable communication device 129 may be partitioned and/or distributed over a plurality of different communication paths or communication links via the access point 102, 112 and/or one or more of the corresponding plurality of distributed transceivers 104a, ..., 104n and/or 114a, ..., 114n. The coordinating entity 108 and/or the central processors 106, 116 in the access points 102, 112, respectively, may be operable to determine the quality of each of the communication paths or communication links. The communication paths or communication links with higher SNR may be configured by the coordinating entity 108 and/or the central processors 106, 116 to carry a higher portion of the overall throughput while the communication paths or communication links with poorer SNR may be configured to carry a smaller portion of the overall traffic. The coordinating entity 108 may be operable to determine that the one or more of the plurality of distributed transceivers 104a, ..., 104n and/or 114a, ..., 114n and/or the antenna arrays 105a, ..., 105n and/or 115a, ..., 115n should be configured to operate in a multiplexing mode and that one or more remaining ones of the plurality of distributed transceivers 104a, ..., 104n and/or 114a, ..., 114n and/or the antenna arrays 105a, ..., 105n and/or 115a, ..., 115n should be configured to operate in a spatial and/or frequency diversity mode. In the multiplexing mode of operation, each of the plurality of distributed transceivers 104a, ..., 104n and/or 114a, ..., 114n in the access points 102, 112, respectively, may be configured to transmit a different data stream to the mobile communication device 129. In the spatial diversity mode and/or the frequency diversity mode of operation, each of the plurality of distributed transceivers 104a, ..., 104n and/or 114a, ..., 114n in the access points 102, 112, respectively, may be configured to transmit the same data stream in order to achieve better reliability and/or quality of transmission. With no loss of generality, the following depicts an example for rate distribution over multiple access points. The coordinating entity realizes effective SNR values of a1×P1, a2×P2, a3×P3 corresponding to links 151n, 151a, and 152, respectively. P1, P2, and P3 represent the transmit power used for links 151n, 151a, and 152, respectively. Finally, a1, a2, a3 are scaling factors that are functions of the propagation environment (path loss, antenna pattern gains, etc). A larger scaling factor represents a link with higher quality. Now, different rate distribution policies may be used by the coordinating entity 108 to provide a total combined capacity or throughput C0 to mobile device 129. If C1, C2, C3 represent the partial throughput over links 151n, 151a, and 152 respectively, then C0=C1+C2+C3 where partial capacities may be modeled (or approximated) as C1=K×log(1+a1×P1), C2=K×log(1+a2×P2), C3=K×log(1+a3×P3), where K is a constant factor. Then the optimization problem is to find a combination of P1, P2, P3 that optimize a cost/merit function (e.g., minimize sum power P1+P2+P3) for a given total achieved capacity C0. The above is one exemplary policy and other policies may be employed or adopted without departing from the spirit and scope of the invention. Other variations may also be adopted.

The coordinating entity 108 may be operable to determine whether different beamforming methodologies may be utilized for different ones of the plurality of distributed transceivers 104a, ..., 104n and/or 114a, ..., 114n in the access points 102, 112, respectively. In this regard, the coordinating entity 108 may be operable to determine that a narrower or a sharper beam pattern may be utilized by distributed transceivers with higher throughput streams, and a wider beam pattern may be utilized by transceivers with lower throughput data streams and/or data streams that may require higher fidelity. For example, the coordinating entity 108 may determine that the access point 102 should configure the distributed transceiver 104a with a wide beam pattern to accommodate a low throughput stream (but with higher fidelity) and configure the distributed transceiver 104n with a narrow sharp beam pattern to accommodate a high throughput stream.

The backhaul connection from the access points 102, 112 may comprise a wired, wireless, optical and/or other type of connection. For example, the communication links 154, 156, 157 are backhaul communication links that provide access to resources and/or services on the Internet 18 (FIG. 1) via the gateway 110. In an exemplary embodiment of the invention, the mobile communication device 129 may want to download data from an external resource such as a database in the server 18a on the Internet 18. The coordinating entity 108 may be operable to split the corresponding traffic from the server 18a to the mobile communication device 129 into a plurality of data streams. The coordinating entity 108 may be operable to route a portion of the corresponding data stream from the server 18a to the access point 102 while a remaining portion of the corresponding data stream may be routed from the server 18a to the access point 112 via the gateway 110 and one or more of the backhaul communication links 154, 156, 157. In this regard, the mobile communication device 129 may be operable to reconstruct the original downloaded data stream by aggregating the different portions of the corresponding data streams that are received via the access points 102, 112.

The coordinating entity 108 may be operable to control various operations, functions and/or resources of the access points 102, 112. In this regard, the coordinating entity 108 may be operable to control and/or manage the configuration and/or reconfiguration of the various operations, functions and/or resources of the access points 102, 112. The coordinating entity 108 may be operable to control and/or manage, for example, the various modes of operation, beam patterns, and/or the data splitting ratio between or among a plurality of access points such as the access points 102, 112. The coordinating entity 108 may be operable to control various operations, functions and/or resources of the access points 102, 112 in a static manner and/or in a dynamic manner as, for example, the channel conditions and/or throughput demands change. The static and/or dynamic control of the various operations, functions and/or resources of the access points 102, 112 may be applied on, for example, a packet-by-packet, frame-by-frame, and/or session-by-session basis.

In an exemplary embodiment of the invention, for a frame-by-frame operation, for a current frame, the coordinating entity 108 may configure the access point 102 to communicate data to the mobile communication device 129 utilizing a first carrier frequency and modulation scheme such as LTE over a 2 GHz carrier frequency. For the subsequent frame, the coordinating entity 108 may reconfigure the access point 102 to communicate data to the mobile communication device 129 utilizing a second carrier frequency and modulation scheme such as, OFDM over a 60 GHz carrier frequency.

In an exemplary embodiment of the invention, for a frame-by-frame operation, for a current frame, the coordinating entity 108 may configure the access point 102 to communicate data to the mobile communication device 129 utilizing a first carrier frequency and modulation scheme such as LTE over a 2 GHz carrier frequency. For the subsequent frame, the coordinating entity 108 may configure the access point 112 to communicate data to the mobile communication device 129 utilizing a second carrier frequency and modulation scheme such as, OFDM over a 60 GHz carrier frequency.

In another exemplary embodiment of the invention, for a session-by-session operation, for a current communication session, the coordinating entity 108 may configure the access point 102 to communicate data to the mobile communication device 129 utilizing a first carrier frequency and modulation scheme such as LTE over a 2 GHz carrier frequency. For the subsequent communication session, the coordinating entity 108 may reconfigure the access point 102 to communicate data to the mobile communication device 129 utilizing a second carrier frequency and modulation scheme such as, OFDM over a 60 GHz carrier frequency.

In another exemplary another embodiment of the invention, for a session-by-session operation, for a current communication session, the coordinating entity 108 may configure the access point 102 to communicate data to the mobile communication device 129 utilizing a first carrier frequency and modulation scheme such as, LTE over a 2 GHz carrier frequency. For the subsequent communication session, the coordinating entity 108 may configure the access point 112 to communicate data to the mobile communication device 129 utilizing a second carrier frequency and modulation scheme such as, OFDM over a 60 GHz carrier frequency.

The point at which the session may be transferred from one access point to another access point may be determined by the coordinating entity 108 based on, for example, location information of mobile communication device 129 and/or the access points 102, 112. In some embodiments of the invention, the location of one or more reflecting and/or refracting objects and/or structures within the communication environment may be utilized by the coordinating entity 108 to determine the characteristics of the beams and/or the transceiver settings that should be utilized in order to optimize communication.

The coordinating entity 108 may be operable to utilize the locations of the mobile communication device 129, the access point 102 and/or the access point 112 in order to provide an initial configuration of network parameters and/or settings for the distributed transceivers beam patterns and directions, power levels, individual stream data rates, and so on. The coordinating entity 108 may also operate in an adaptive manner in which it may be trained over time as it builds up a history of good settings for different locations, different devices, different environmental conditions and so on, as more users connect to the communication network.

In an exemplary embodiment of the invention, it may be assumed that the mobile communication device 129 is located at a position specified by the coordinates (x1, y1, z1) and/or its spatial orientation. The coordinating entity 108 may be operable to utilize various positioning techniques, such as triangulation for example, in order to estimate the position and/or orientation of the mobile communication device 129. The coordinating entity 108 may be operable to utilize various training and estimation/optimization methods to determine the optimal configuration and/or settings for the plurality of distributed transceivers 104a, . . . , 104n, 114a, . . . , 114n, and/or the antenna arrays 105a, . . . , 105n, 115a, . . . , 115n in the network that may deliver the best capacity and/or performance to the mobile communication device 129. These settings may comprise, for example, activate access points, activate transceivers, beam-forming settings, transmit power levels for each of the plurality of distributed transceivers, orientation of the antenna arrays and/or corresponding antenna array elements, and so on. The coordinating entity 108 may be operable to store these optimal settings along with the location data (eg x1, y1, z1) in a database within the memory 108b. The next time that the coordinating entity 108 is establishing a connection with another mobile communication device, which may be located at or near (x1, y1, z1), it uses the optimal settings stored from previous connections as a good starting point to greatly speed up the connection setup and its optimization. The database, which may be stored in the memory 108b, may also be utilized by the system to improve the accuracy of location finding algorithms over time. In this case, the reverse of the above procedure may be utilized for positioning improvement. The coordinating entity 108 utilizes the close correlation between location and optimal settings to map optimal settings to a location value. For example, the coordinating entity 108 may be operable to store, in the database in the memory 108b, information, which indicates that for the mobile communication device 129 at location (x1, y1, z1), the optimal network settings (eg S1) leads to the best link performance. In instances where the coordinating entity 108 establishes a link with another mobile communication device, and after iterations of settings, for example, optimizing beam patterns, power levels, antenna array orientation, and so on, the optimal settings converge to the value S1 in the database, the coordinating entity 108 may be operable to conclude that the mobile communication device is within the vicinity of location (x1, y1, z1). The information stored in the database in the memory 108b may be based on ongoing measurements and analysis of current and/or stored data.

Different location techniques may be utilized by the system for the above purpose. Exemplary location techniques may comprise global navigation satellite system (GNSS) such as global positioning system (GPS), triangulation, and/or a known location of a neighboring device such as a WiFi access point. Additionally, the location data may be utilized by the coordinating entity 108 to identify a possible set of distributed transceivers that may be better suited for multi-stream operations, such as multiplexing in the same frequency channel, by demonstrating good phase condition properties.

The role of the coordinating entity 108 in configuring resources, for example the initial settings and/or carrier frequencies, may be shared or combined with the role of a medium access controller (MAC). In other words, the information collected and/or utilized by the coordinating entity 108 may also be used by the MAC controller to improve other MAC functionalities.

In one exemplary embodiment of the invention, the data demodulation (digital processing of sampled data by analog-to-digital converters) may be performed by each central baseband processors 106, 116, which may be located within the access points 102, 112, respectively. The final information data streams, after signal processing and decoding are done, may be communicated from the access points 102, 112. This may minimize the backhaul throughput out of the access points 102, 112.

In another exemplary embodiment of the invention, the raw data out of analog-digital converters corresponding to different distributed transceivers within the access points 102, 112 or the data after some partial digital signal processing, may be transported to the coordinating entity 108 for processing. The coordinating entity 108 may be operable to complete the remaining digital and/or baseband processing on the samples collected from one or more of the distributed transceivers 104a, . . . , 104n, 114a, . . . , 114n within access points 102, 112, respectively. This configuration may require a higher throughput for the backhaul communication links 154, 156 from access points 102, 112 to the coordinating entity 108 as raw data is being communication over the backhaul links 154, 156. This may be suitable in instances when the backhaul communication links 154, 156 between the access points 102, 112 and the coordinating entity 108 comprise a very high throughput such as optical links and/or high throughput Ethernet connections. In return, the coordinating entity 108 may be operable to perform joint processing and/or decoding of the streams that are captured by the various spatially-separated plurality of distributed transceivers 104a, . . . , 104n, 114a, . . . , 114n within access points 102, 112, respectively. This access to raw samples may be exploited to achieve a higher link performance. For example, in the distributed transceiver 104a in the access point 102 and the distributed transceiver 114a in the access point 112 are configured to receive the same data stream from mobile communication device 129, the coordinating entity 108 may process the captured samples from the plurality of distributed transceivers 104a, 114a jointly in an optimal fashion, for example, maximal ratio combining (MRC) after co-phasing the two corresponding sequence of samples. The joint processing may be extended to other modes of operation such as spatial multiplexing, spatial diversity, frequency diversity, multiple input multiple output (MIMO) processing, and so on.

In accordance with various embodiments of the invention, phase condition optimization (e.g., $\theta_{12}-\theta_{11}+\theta_{21}-\theta_{22}=$ (2180°) may be performed over a plurality of distributed transceivers such as the distributed transceivers 104a, 114a in the access points 102, 112. This may be useful when attempts to achieve the phase condition between the distributed transceivers within a single access point becomes difficult due to the particular spatial separation of the distributed transceivers within the single access point. In such instances, the coordinating entity 108 may be operable to identify distributed transceivers across a plurality of devices such as the access points 102, 112, which may be operable to better to meet the optimal phase condition requirements. The coordinating entity 108 is operable to collect the samples from the corresponding distributed transceivers, for example distributed transceivers 104a, 114a, in different access points 102, 112 and performs the joint processing of the corresponding sequences in order to maximize the multiplexed capacity and/or throughput.

In some embodiments of the invention, the mobile communication device 129 may be operable to receive its overall target data stream through aggregation of partial streams, which may be transmitted concurrently over a plurality of different access-points. For example, the mobile communication device 129 may be operable to receive the overall target data stream through aggregation of partial streams, which may be transmitted concurrently from the access point 102 and the access point 112. The mobile communication device 129 may be operable to receive its overall target data stream from the same distributed transceivers within the access point 102 and the access point 112 and/or from different distributed transceivers within the access point 102 and the access point 112. In instances where the spatial multiplexing mode is utilized, the corresponding partial data streams may be communicated over the same frequency by relying on the spatial separation of the access points 102, 112 and/or the beam pattern separations associated with antenna arrays for the corresponding distributed transceivers. In spatial multiplexing mode, the coordinating entity may monitor the cross-interference between all these concurrent co-channel links 151n, 151a, 152, 153 (due to cross-leakage between the antenna patterns). As long as antenna patterns can be adjusted to keep the cross-interference below a threshold, the coordinating entity 108 continues operating the network in spatial multiplexing mode (for maximal frequency reuse). If cross-interference is no longer avoidable (due to position of devices and directions of arrival), the coordinating entity 108 may decide to switch to frequency multiplexing to prevent a drop in throughput. If the frequency multiplexing mode is used, those partial data streams are sent over different carrier frequencies (at the same time). As another example, a hybrid combination may be configured by the coordinating entity 108 where links 151a and 152 are operated in the same frequency (since spatial separation is sufficiently large due to angles of arrival difference), but link 151n is operated at a different frequency than link 151a (since the cross-interference is expected to be large given the positions of the devices). Similarly, methods and policies may be adopted to operate the distributed transceivers in the modes of spatial multiplexing, spatial diversity, frequency multiplexing, frequency diversity, and MIMO processing, according to embodiments in U.S. application Ser. Nos. 13/473,096, 13/473,144, 13/473,105, 13/473,160, 13/473,180, 13/473,113, 13/473,083, which are hereby incorporated herein by reference in its entirety.

Figure 3:
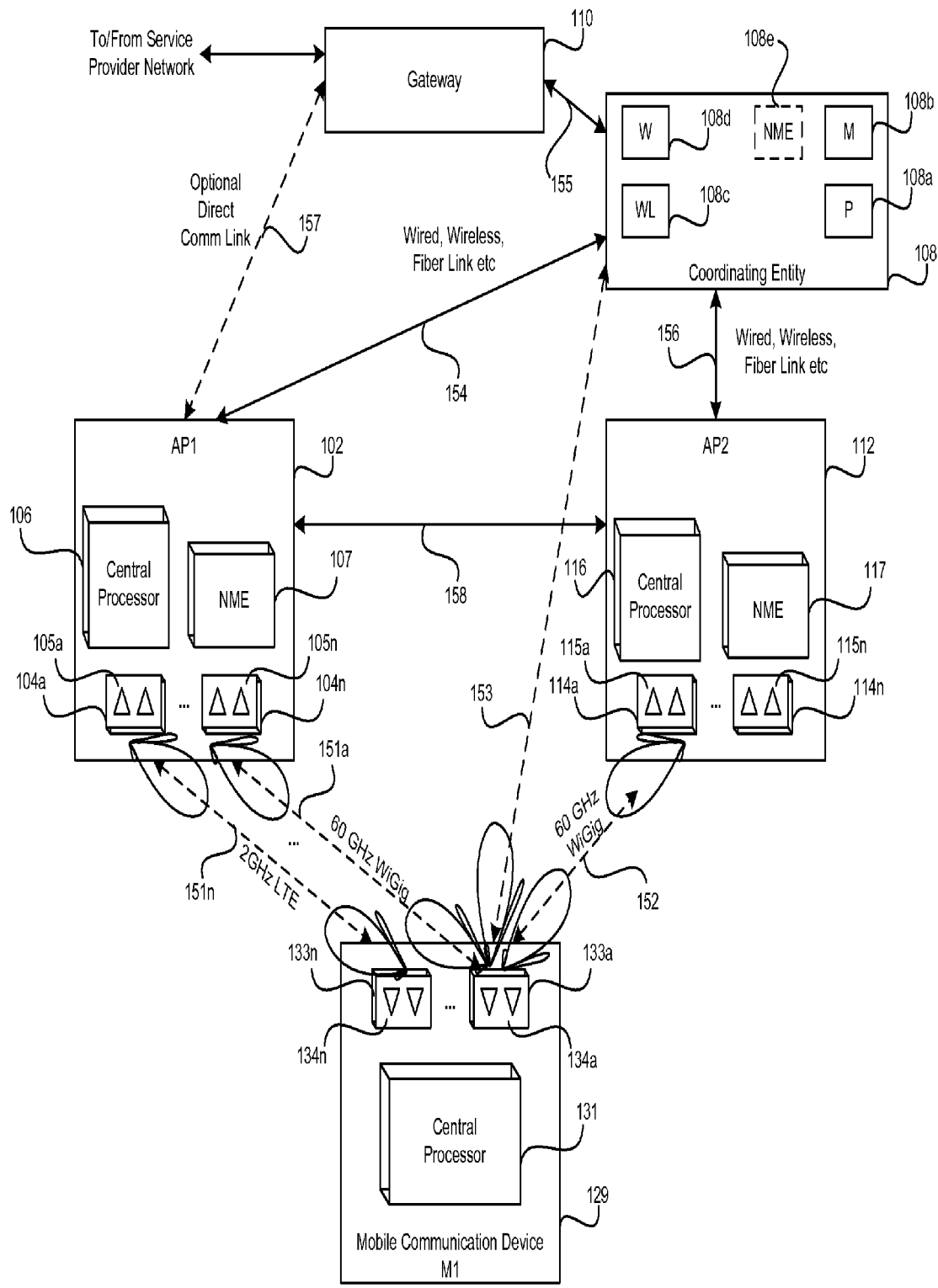
FIG. 3 is a block diagram illustrating distributed transceivers utilized for wireless communication in access points where the access points utilize different link protocols and/or operating modes, in accordance with an exemplary embodiment of the invention.

FIG. 3 is a block diagram illustrating distributed transceivers utilized for wireless communication in access points where the access points utilize different link protocols and/or operating modes, in accordance with an exemplary embodiment of the invention. FIG. 3, there are shown access points 102, 112, a mobile communication device 129, a coordinating entity 108 and a gateway 110. The access points 102, 112, the mobile communication device 129, the coordinating entity 108 and the gateway 110 may be substantially similar to the corresponding components, which are shown in and described with respect to FIG. 2, for example. The components within each of the access points 102, 112, the mobile communication device 129 and the coordinating entity 108 may be substantially similar to the corresponding components, which are shown in and described with respect to FIG. 2, for example. The communication links 151a, . . . , 151n, 152, 153, 154, 155, 156, 157 and 158 may be substantially similar to the corresponding components, which are shown in and described with respect to FIG. 2, for example.

The access point 102 may also comprise a network management engine (NME) 107. The network management engine 107 may be operable to manage communication resources within the access point 102. The network management engine 107 may be operable to coordinate managing of the communication resources for the access point 102 with the coordinating entity 108 and/or the network management engine 117 in the access point 112.

The access point 112 may also comprise a network management engine 117. The network management engine 117 may be operable to manage communication resources within the access point 112. The network management engine 117 may be operable to coordinate managing of the communication resources for the access point 112 with the coordinating entity 108 and/or the network management engine 107 in the access point 102.

The coordinating entity 108 may also comprise an optional network management engine 108e. The optional network management engine 108e may be operable to coordinate, oversee and/or manage the operation of one or more of the network management engines in the network. For example, the optional network management engine 108e may be operable to coordinate, oversee and/or manage operation of the network management engine 107 in the access point 102 and/or the network management engine 117 in the access point 112. In this regard, the optional network management engine 108e may be operable to coordinate operation of the communication resources within the access points 102, 112. In general, some or all of the functions that are handled by the network management engines 107, 117 may be coordinated by the network management engine 108e. The optional network management engine 108e may be operable to utilize information from the gateway 110, the access point 102, the access point 112, the mobile communication device 129, and/or from within the coordinating entity 108 to coordinate, oversee and/or manage the operation of one or more of the network management engines in network.

In accordance with various embodiments of the invention, the distributed transceivers within a unit or device such as the access points 102, 112 and/or the mobile communication device 129 may be operable to support different carrier frequencies and/or modulation schemes through the same distributed transceiver implementation. In some embodiments of the invention, some of the distributed transceivers within a unit or device such as the access points 102, 112 and/or the mobile communication device 129 may be enabled to operate at certain carrier frequency ranges and/or utilize certain modulation schemes, while other distributed transceivers within the unit or device may be enabled to operate at other carrier frequency ranges and/or utilize different modulation schemes.

In various exemplary embodiment of the invention, the distributed transceiver 104a and the distributed transceiver 104n, which are both within the access point 102, may be operable to utilize different carrier frequencies and/or modulation schemes. As illustrated in FIG. 3, the distributed transceiver 104a may be operable to utilize a lower carrier frequency such as 2 GHz based on cellular, such as LTE, or WLAN modulation and/or constellations and protocols such as code division multiple access (CDMA) and variants thereof, orthogonal frequency division multiplexing (OFDM) in 2 GHz carrier frequency with different channel bandwidths, for example, 5 MHz, 10 MHz and/or 20 MHz. Other distributed transceivers in the access point 102 or the access point 112 may be operable to utilize higher carrier frequencies such as 60 GHz based on WiGig, 802.11ad modulations, constellations, and/or protocols, for example, single-carrier modulation or OFDM. In an exemplary embodiment of the invention, the distributed transceiver 114a in the access point 112 may be operable to utilize a 60 GHz WiGig modulation, constellations, and/or protocols. In some embodiments of the invention, the access points 102, 112 may comprise reconfigurable and/or programmable components, which may be reconfigured and/or programmed to support higher and/or lower carrier frequencies and/or different modulation, constellations and/or protocols over the same distributed transceivers. Different multi-mode management schemes may also be utilized.

Each of the network management engines 107, 117 in the access points 102, 112, respectively, may be operable to manage the resources within each of the corresponding access points 102, 112. For example, the network management engine 107 in the access point 102 may be operable to manage, for example, the carrier frequencies, beam patterns, protocols and/or modulation schemes that are utilized by the plurality of distributed transceivers 104a, . . . , 104n, which are located in the access point 102. Similarly, the network management engine 117 in the access point 112 may be operable to manage, for example, the carrier frequencies, beam patterns, protocols and/or modulation schemes that are utilized by the plurality of distributed transceivers 114a, . . . , 114n, which are located in the access point 112. Although network management engines are shown only in the access points 102, 112, and the coordinating entity 108, the invention is not necessarily limited in this regard. Accordingly, a network management engine may reside in other components within the network. For example, a network management engine may be located in the gateway 110. In cases where a close coordination is desired or required between the network management engines 107, 117, the optional network management engine 108e may be operable to coordinate operation of the distributed network management engines 107, 117, which may be located in the access points 102, 112, respectively. The network management engines 107, 117 and/or the optional network management engine 108e may be operable to dynamically and/or adaptively reassign and/or reactivate transceiver resources in the access points 102, 112 to different carrier frequencies, modulation schemes and/or protocol schemes. Based on propagation conditions and throughput demands, the network management engines 107, 117 and/or the optional network management engine 108e may be operable to reconfigure the plurality of distributed transceivers 104a, . . . , 104n and/or 114a, . . . , 114n, which are located in the access points 102, 112, respectively.

In some cases, one or more of the network management engines 107, 117 and/or the optional network management engine 108e may be operable to configure and/or activate some of the plurality of distributed transceivers of the transceivers 104a, . . . , 104n and 114a, . . . , 114n, which are located in the access points 102, 112, respectively, to operate at lower carrier frequencies while others of the plurality of distributed transceivers 104a, . . . , 104n and 114a, . . . , 114n may be configured and/or activated to operate at higher carrier frequencies. Accordingly, one or more of the network management engines 107, 117 and/or the optional network management engine 108e may be operable to optimize the overall link throughput and/or performance for the data being transported and/or aggregated over the plurality of carrier frequencies.

In instances when one or more of the network management engines 107, 117 and/or the optional network management engine 108e may configure one or more the plurality of distributed transceivers 104a, . . . , 104n and 114a, . . . , 114n to operate at, for example, a 2 carrier frequency and there may be a request for higher capacity and/or throughput, one or more of the network management engines, 107, 117 and/or the optional network management engine 108e may be operable to establish additional streams over, for example, a 60 GHz carrier frequency, in parallel, utilizing additional available transceiver resources. In some instances, one or more of the network management engines, for example, the network management engines 107, 117 and/or the optional network management engine 108e may be operable to reassign at least a portion of the resources used for 2 GHz carrier frequency to the 60 GHz carrier frequency and provide the requested capacity over at least a portion of the 60 GHz carrier frequencies. In this regard, there may be instances when one or more of the network management engines, for example, the network management engines 107, 117 and/or the optional network management engine 108e may be operable to reassign all of the resources used for 2 GHz carrier frequency to the 60 GHz carrier frequency and provide the requested capacity over only the 60 GHz carrier frequencies.

In some embodiments of the invention, the network management engine 107, the network management engine 117 and/or the optional network management engine 108e may be operable to assign different traffic types and/or class of traffic for transporting over different carrier frequencies depending on the requirements of each traffic type and/or class. For example, critical but low throughput control traffic may be assigned to be transported over lower carrier frequencies, for example, LTE in the 2 GHz carrier frequency range, while high throughput video streaming traffic may be assigned to be transported concurrently over higher carrier frequencies such as one or more mmWave links in the 60 GHz carrier frequency range. Similarly, in order to provide a particular QoS (latency for voice/video over IP) to the mobile communication device 129 and/or to handle specific CoS traffic (voice, browsing data, video, etc), the network management engine 107, the network management engine 117 and/or the optional network management engine 108e may be operable to assign corresponding traffic for transporting over different carrier frequencies.

In a location-based allocation of resources mode of operation, the network management engine 107, the network management engine 117 and/or the optional network management engine 108e may be operable to utilize the location and/or orientation of the mobile communication device 129 and/or the locations of one or more of the access points 102, 112 to determine the carrier frequencies to activate and/or utilize to provide the requested link throughput. The network management engine 107, the network management engine 117 and/or the optional network management engine 108e may be operable to utilize past history of link quality per carrier frequency versus the corresponding location of a mobile communication device such as the mobile communication device 129 to determine the carrier frequencies to activate and/or utilize the requested link throughput. Locations with history of good 60 GHz propagation conditions may utilize one or more of 60 GHz carrier frequencies. Locations with poorer 60 GHz propagation properties may rely more on lower carrier frequencies such as LTE at 2 GHz carrier frequency. In some embodiments of the invention, additional sensors may be used to sense and/or acquire other data from the environment and that other data may be utilized to establish the link from better initial settings for the plurality of distributed transceivers 104a, . . . , 104n, and 114a, . . . , 114n. The sensed and/or acquired data may comprise, for example, time, date, temperature, atmospheric conditions, and so on. The history and location information may be stored in the memory 108b of the coordinating entity 108. A combination of coarse and fine positioning methods may be utilized. A coarse method (e.g., based on WiFi signal) may be used for quick initialization of settings, followed by a finer method (e.g., based on mmWave signal) for tuning the settings.

In a price-based allocation of resources mode of operation, the network management engine 107, the network management engine 117, the optional network management engine 108e and/or network operator may utilize a pricing scheme for allocation of carrier frequencies. While certain carrier frequencies can be allocated and/or utilized for users requesting free service, other carrier frequencies, for example, carrier frequencies with better quality, throughput, latency and/or capacity characteristics, may be allocated for premium users or users that are paying a fee. In some embodiments of the invention, the activation of higher quality services, for example, through certain carrier frequencies may be done by users on a per-demand basis. In such cases, the user may activate an application running on a communication device such as one of the communication devices 30a, 30b, 30c, . . . , 30n, 42a, 42b, 42c, . . . , 42n to enable a higher quality service. The higher quality service may require a higher payment by the user.

Figure 4:
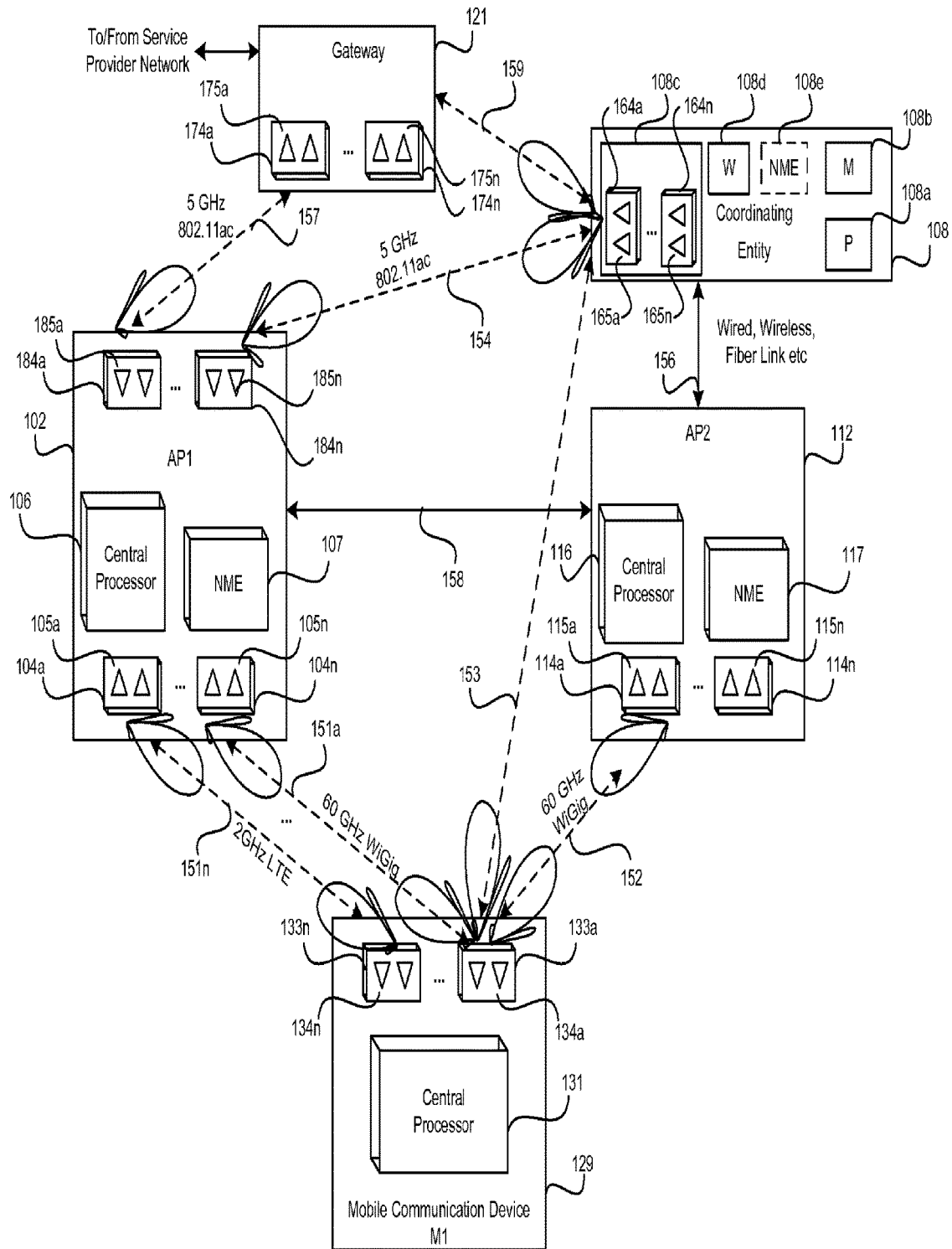
FIG. 4 is a block diagram illustrating distributed transceivers utilized for wireless communication in access points where the access points utilize wireless backhaul links, in accordance with an exemplary embodiment of the invention.

FIG. 4 is a block diagram illustrating distributed transceivers utilized for wireless communication in access points where the access points utilize wireless backhaul links, in accordance with an exemplary embodiment of the invention. FIG. 4, there are shown access points 102, 112, a mobile communication device 129, a coordinating entity 108 and a gateway 110. The access points 102, 112, the mobile communication device 129, the coordinating entity 108 and the gateway 110 may be substantially similar to the corresponding components, which are shown in and described with respect to FIG. 2, for example. The components within each of the access points 102, 112, the mobile communication device 129 and the coordinating entity 108 may be substantially similar to the corresponding components, which are shown in and described with respect to FIG. 2, for example. The communication links 151a, ..., 151n, 152, 153, 154, 155, 156, 157 and 158 may be substantially similar to the corresponding components, which are shown in and described with respect to FIG. 2, for example. The communication links 154, 157 and 159 are different.

The access point 102 may also comprise a network management engine (NME) 107. The network management engine 107 may be operable to manage communication resources within the access point 102. The network management engine 107 may be operable to coordinate managing of the communication resources for the access point 102 with the coordinating entity 108 and/or the network management engine 117 in the access point 112. In addition to the plurality of distributed transceivers 104a, ..., 104n, and a corresponding plurality of antenna arrays 105a, ..., 105n, the access point 102 may also comprise a plurality of distributed transceivers 184a, ..., 184n, and a corresponding plurality of antenna arrays 185a, ..., 185n. The plurality of distributed transceivers 184a, ..., 184n, and a corresponding plurality of antenna arrays 185a, ..., 185n may be substantially similar to the plurality of distributed transceivers 104a, ..., 104n, and a corresponding plurality of antenna arrays 105a, ..., 105n, and the plurality of distributed transceivers 114a, ..., 114n, and the corresponding plurality of antenna arrays 115a, ..., 115n, respectively.

The access point 112 may also comprise a network management engine 117. The network management engine 117 may be operable to manage communication resources within the access point 112. The network management engine 117 may be operable to coordinate managing of the communication resources for the access point 112 with the coordinating entity 108 and/or the network management engine 107 in the access point 102.

The coordinating entity 108 may also comprise an optional network management engine 108e. The optional network management engine 108e may be operable to coordinate, oversee and/or manage the operation of one or more of the network management engines in network. For example, the optional network management engine 108e may be operable to coordinate, oversee and/or manage operation of the network management engine 107 in the access point 102 and/or the network management engine 117 in the access point 112. In this regard, the optional network management engine 108e may be operable to coordinate operation of the communication resources within the access points 102, 112. In general, some or all of the functions that are handled by the network management engines 107, 117 may be coordinated by the network management engine 108e. The optional network management engine 108e may be operable to utilize information from the gateway 110, the access point 102, the access point 112, the mobile communication device 129, and/or from within the coordinating entity 108 to coordinate, oversee and/or manage the operation of one or more of the network management engines in the network. Methods of operating distributed transceivers in spatial multiplexing, frequency multiplexing, spatial diversity, and frequency diversity, are disclosed in U.S. application Ser. Nos. 13/473,096, 13/473,144, 13/473,105, 13/473,160, 13/473,180, 13/473,113, 13/473,083, which are incorporated herein by reference in there entirety, and may be utilized to optimize the links between 102, 121 and between 108, 121.

The wireless interface 108c comprises a plurality of distributed transceivers 164a, ..., 164n, and a corresponding plurality of antenna arrays 165a, ..., 165n. The plurality of distributed transceivers 164a, ..., 164n, and a corresponding plurality of antenna arrays 165a, ..., 165n may be substantially similar to the plurality of distributed transceivers 104a, ..., 104n, and a corresponding plurality of antenna arrays 105a, ..., 105n, and the plurality of distributed transceivers 114a, ..., 114n, and a corresponding plurality of antenna arrays 115a, ..., 115n.

The communication link 154 comprises a backhaul communication link between the access point 102 and the coordinating entity 108. The communication link 154 may comprise, for example, a 5 GHz 802.11ac link.

The communication link 157 comprises a backhaul communication link between the access point 102 and the gateway 110. The communication link 157 may comprise, for example, a 5 GHz 802.11ac link.

The communication link 159 is a backhaul communication link between the coordinating entity 108 and the gateway 110. The communication link 159 may comprise, for example, a 5 GHz 802.11ac link.

Referring to FIG. 4, the access points 102 is operable to provide wireless access to the mobile communication device 129 via the distributed transceivers 104n via the communication link 151a. The communication link 151a may comprise a 60 GHz WiGig communication link or other type of high speed communication link. The access point 102 may utilize the distributed transceiver 184a to backhaul traffic from the mobile communication device 129 to the gateway 121 via the communication link 157.

Figure 5:
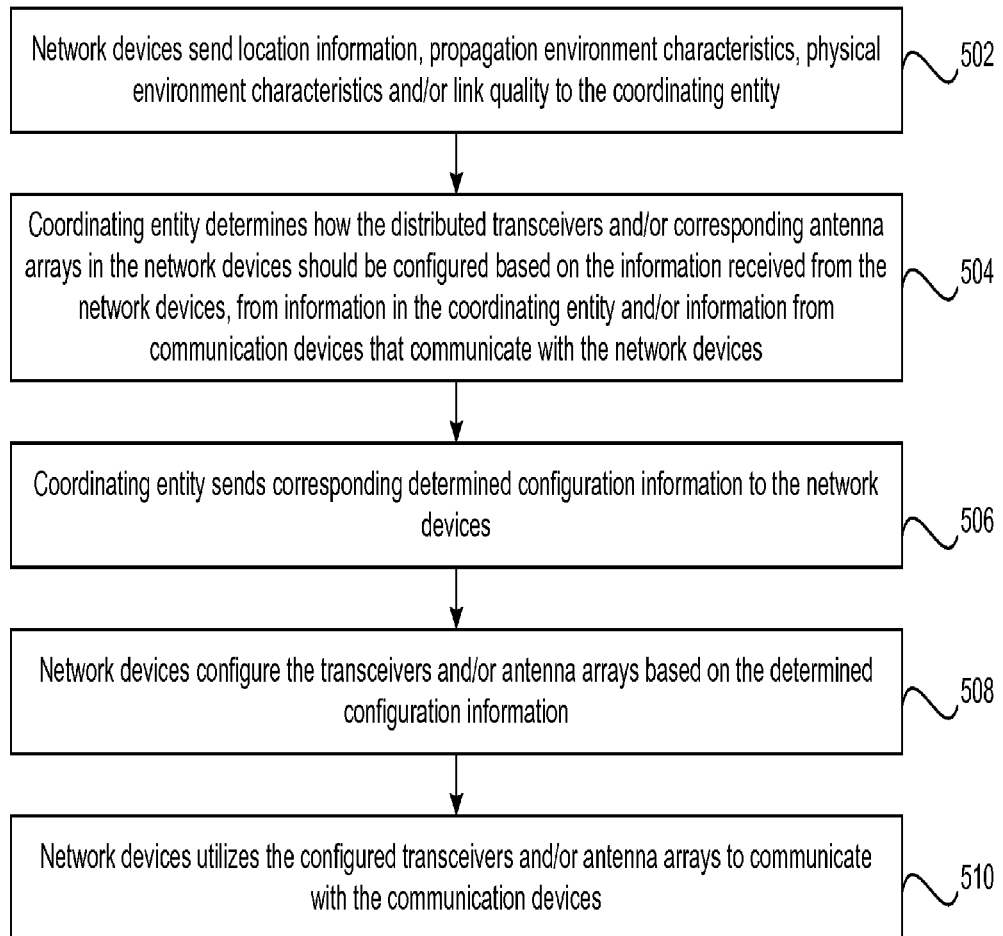
FIG. 5 is a flow chart illustrating exemplary steps for coordinating communication for a plurality of distributed transceivers, in accordance with an exemplary embodiment of the invention.

FIG. 5 is a flow chart illustrating exemplary steps for coordinating communication for a plurality of distributed transceivers, in accordance with an exemplary embodiment of the invention. Referring to FIG. 5, there are shown exemplary steps 502 through 510. In step 502, the network devices send location information, propagation environment characteristics, physical environment characteristics and/or link quality to the coordinating entity. In step 504, the coordinating entity determines how the distributed transceivers and/or corresponding antenna arrays in the network devices should be configured based on the information received from the network devices, from information in the coordinating entity and/or information from communication devices that communicate with the network devices. In step 506, the coordinating entity sends the corresponding determined configuration information to the network devices. In step 508, the network devices configure the transceivers and/or antenna arrays based on the determined configuration information. In step 510, the network devices utilize the configured transceivers and/or antenna arrays to communicate with communication devices.

In some embodiments of the invention, a plurality of concurrent 802.11ac datastreams from different access points may be utilized to provide a high capacity communication link for conveying data to an access point. For example, the access point 102 may be exchanging data with both the coordinating processor 108 and the gateway 121 through two wireless communication links. The access point 102 may be operable to aggregate the two 802.11ac streams, for example, one from the gateway 121 and another from the coordinating processor 108 to handle traffic for the server 18a on the Internet 18. Addition parallel and/or concurrent 802.11ac datastreams may also be utilized by the access point 102, for example, via the same frequency channel or different frequency channels, in order to further increase the link capacity.

Figure 6:
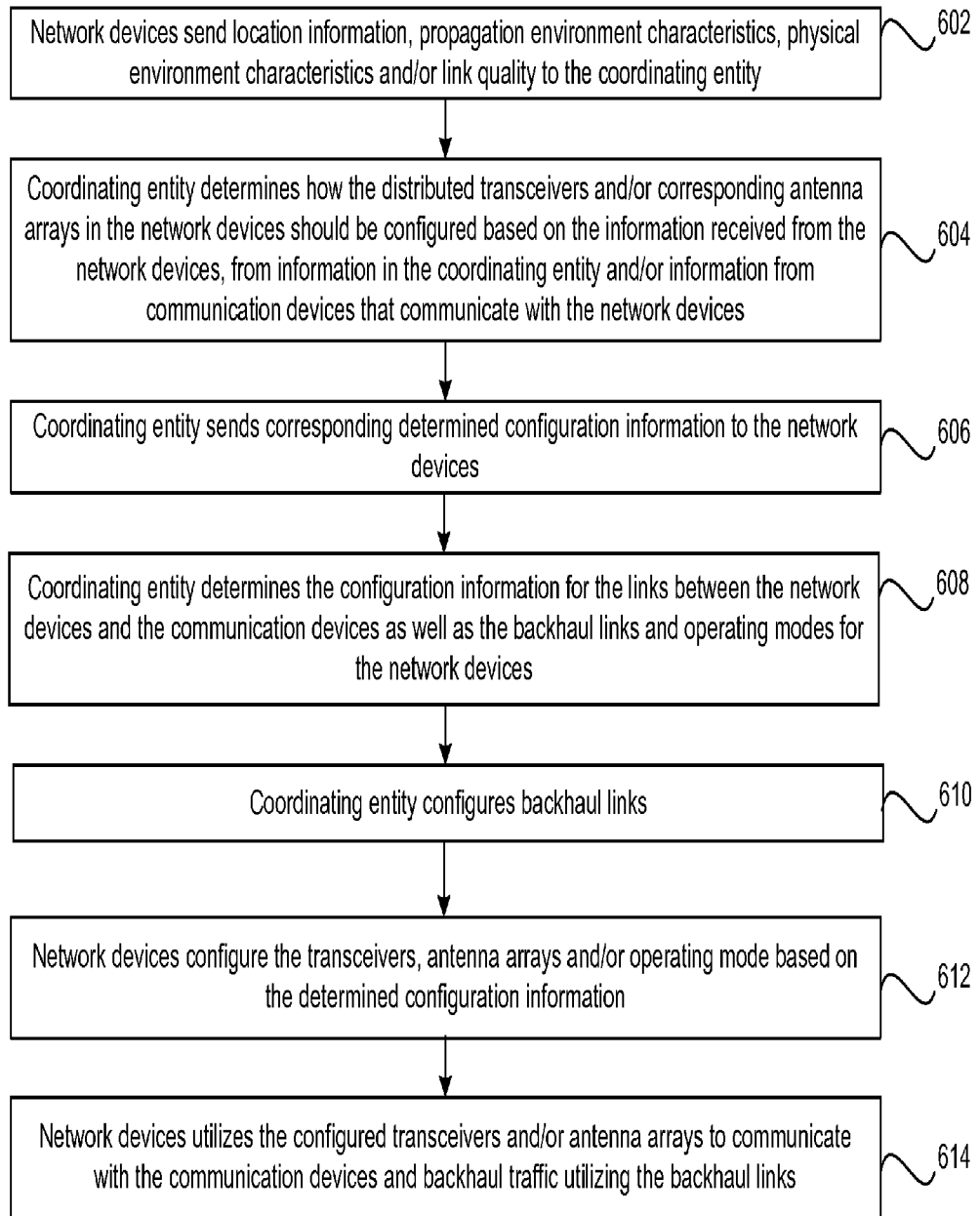
FIG. 6 is a flow chart illustrating exemplary steps for coordinating communication for a plurality of distributed transceivers, in accordance with an exemplary embodiment of the invention.

FIG. 6 is a flow chart illustrating exemplary steps for coordinating communication for a plurality of distributed transceivers, in accordance with an exemplary embodiment of the invention. Referring to FIG. 6, there are shown exemplary steps 602 through 614. In step 602, the network devices send location information, propagation environment characteristics, physical environment characteristics and/or link quality to the coordinating entity. In step 604, the coordinating entity determines how the distributed transceivers and/or corresponding antenna arrays in the network devices should be configured based on the information received from the network devices, from information in the coordinating entity and/or information from communication devices that communicate with the network devices. In step 606, the coordinating entity sends the corresponding determined configuration information to the network devices.

In step 608, the coordinating entity determines the configuration information for the links between the network devices and the communication devices as well as the backhaul links and operating modes for the network devices. In step 610, the coordinating entity configures the backhaul links. In step 612, the network devices configure the transceivers, antenna arrays and/or operating modes based on the determined configuration information. In step 614, the network devices utilize the configured transceivers and/or antenna arrays to communicate with communication devices and backhaul traffic utilizing the backhaul links.

In some embodiments of the invention, a plurality of concurrent 802.11ac datastreams from different access points may be utilized to provide a high capacity communication link for conveying data to an access point. For example, the access point 102 may be exchanging data with both the coordinating processor 108 and the gateway 121 through two wireless communication links. The access point 102 may be operable to aggregate the two 802.11ac streams, for example, one from the gateway 121 and another from the coordinating processor 108 to handle traffic for the server 18a on the Internet 18. Addition parallel and/or concurrent 802.11ac datastreams may also be utilized by the access point 102, for example, via the same frequency channel or different frequency channels, in order to further increase the link capacity.

Various aspects of the invention may comprise a controlling entity 108, which is operable to communicate with a plurality of network devices such as the access points 102, 112. Each of the plurality of network devices such as the access points 102, 112 may comprise a plurality of distributed transceivers 104a, . . . , 104n, 114a, . . . , 114n and one or more corresponding antenna arrays 105a, . . . , 105n, 115a, . . . , 115n, respectively. The controlling entity 108 may be operable to receive information from one or more of the plurality of network devices such as the access points 102, 112 and/or from one or more communication devices such as the mobile communication device 129, which are communicatively coupled to the one or more of the plurality of network devices such as the access points 102, 112. Exemplary received information comprises location information, propagation environment characteristics, physical environment characteristics and/or link quality.

The controlling entity 108 may be operable to coordinate communication of data streams for one or more of the plurality of distributed transceivers 104a, . . . , 104n, 114a, . . . , 114n and one or more corresponding antenna arrays 105a, . . . , 105n, 115a, . . . , 115n, respectively, for the plurality of network devices such as the access points 102, 112 based on the received information. Exemplary network devices may comprise access points, routers, switching devices, gateways, and/or set top boxes. The controlling entity 108 may be integrated within one of the plurality of network devices such as the access points 102, 112 or may be located external to the plurality of network devices. In some embodiments of the invention, one or more functions performed by the controlling entity 108 are split between the controlling entity and one or more of the plurality of network devices such as the access points 102, 112.

The controlling entity 108 may be operable to dynamically and/or adaptively control adjustment of one or more configuration settings for the one or more of the plurality of distributed transceivers 104a, . . . , 104n, 114a, . . . , 114n and one or more corresponding antenna arrays 105a, . . . , 105n, 115a, . . . , 115n, respectively, for one or more of the plurality of network devices such as the access points 102, 112, based on the received information. The controlling entity 108 may also be operable to store the received information to generate a history of received information. The controlling entity 108 may aggregate the history of the received information with current information that may be received from one or more of the plurality of network devices such as the access points 102, 112, and/or from the one or more communication devices such as the mobile communication device 129. The controlling entity 108 may also be operable to dynamically and/or adaptively control adjustment of one or more configuration settings for the one or more of the plurality of distributed transceivers 104a, . . . , 104n, 114a, . . . , 114n and one or more corresponding antenna arrays 105a, . . . , 105n, 115a, . . . , 115n, respectively, for one or more of the plurality of network devices such as the access point 102, 112 based on the aggregated history of received information and current received information.

The controlling entity 108 may also be operable to dynamically and/or adaptively control two or more of the plurality of distributed transceivers in a network device such as the network device 102 to utilize different modes of operation and/or to split the communication of the data streams amongst one or more of the plurality of distributed transceivers 104a, . . . , 104n in a corresponding plurality of network devices. Exemplary modes of operation may comprise a spatial diversity mode, a frequency diversity mode, a spatial multiplexing mode, a frequency multiplexing mode and a MIMO mode of operation. The controlling entity 108 may be operable to backhaul traffic from one or more of the network devices via one or more wired and/or wireless communication links. In an exemplary embodiment of the invention, the distributed transceivers, for example, the distributed transceivers 104a, . . . , 104n, 114a, . . . , 114n may be configured to switch between spatial diversity mode, frequency diversity mode, multiplexing mode and multiple-input-multiple-output (MIMO) mode based on, for example corresponding propagation environment conditions, link quality, device capabilities, device locations, resource availability and/or usage, latency requirements, target throughput and/or link budgets, application QoS requirements, class of service, and/or traffic type. The controlling entity may also be operable to control two or more of the plurality of distributed transceivers 104a, . . . , 104n, 114a, . . . , 114n in a network device such as the access points 102, 112 to utilize different modulation schemes, constellations, protocols, frequencies, wireless standards and/or bandwidths to handle different types of data traffic and/or control traffic based on the received information.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other embodiments of the invention may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for distributed transceivers for distributed access points connectivity.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of communicating data in a communication network comprising a controlling entity, the method comprising:

at the controlling entity, receiving raw data related to a plurality of data streams from a plurality of network devices, each network device comprising a plurality of distributed transceivers, each distributed transceiver comprising a corresponding antenna array, the raw data received from each particular network device comprising a sequence of data samples of said data streams collected from one or more distributed transceivers of the particular network device;

at the controlling entity, performing joint processing of the sequences of data samples of said data streams received from each network device;

at the controlling entity, coordinating communication of said data streams for said plurality of distributed transceivers and the corresponding antenna arrays for said plurality of network devices based on said joint processing of the sequences of data samples of said data streams, wherein performing joint processing of the sequences of data samples comprises:

co-phasing the sequences of data samples received from each network device; and combining the co-phased sequences.

2. The method of claim 1, wherein receiving the raw data from the plurality of network devices comprises:

establishing a high throughput link between the controlling entity and each of the plurality of network devices; and backhauling the raw data by the controlling entity from the plurality of network devices through the high throughput links.

3. The method of claim 1 further comprising, by the controlling entity, controlling a set of distributed transceivers of a set of network devices in the plurality of network devices to utilize different modes of operation and to split the communication of the data streams amongst the set of distributed transceivers of each network device, the modes of operation comprising a spatial diversity mode, a frequency diversity mode, a spatial multiplexing mode, a frequency multiplexing mode, and a multiple input multiple output (MIMO) mode.

4. The method of claim 1 further comprising configuring, by the controlling entity, a set of distributed transceivers in each of the plurality of network devices to utilize different modulation schemes, beamforming configurations, constellations, protocols, frequencies, wireless standards, bandwidths to handle different types of data traffic and/or control traffic based on said received information.

5. The method of claim 1 further comprising:

storing the received data to generate a history of received data;

aggregating the history of received data with current data received from the plurality of network devices; and controlling an adjustment of one or more configuration settings for one or more distributed transceivers and one or more antenna arrays of a set of network devices in the plurality of network devices based on the aggregated history of received data and the current data received.

6. The method of claim 1, wherein the received raw data corresponds to one or more of location information, propagation environment characteristics, physical environment characteristics and link quality.

7. The method of claim 1, wherein each network device comprises one of an access point, a router, a switching device, a gateway, and a set top box.

8. The method of claim 1, wherein the controlling entity is located external to each of the plurality of network devices.

9. The method of claim 1, wherein the controlling entity is integrated within one of the plurality of network devices.

10. A network controlling device, comprising:
a set of one or more processors configured to:
receive raw data related to a same plurality of data streams from a plurality of network devices, each network device comprising a plurality of distributed transceivers, each distributed transceiver comprising an antenna array, the raw data received from each particular network device comprising a sequence of data samples of said data streams collected from one or more distributed transceivers of the particular network device;
perform joint processing of the sequences of data samples of said data streams received from each network device;
coordinate communication of said data streams for said plurality of distributed transceivers and the antenna arrays for said plurality of network devices based on said joint processing of the sequences of data samples of said data streams,
wherein performing joint processing of the sequences of data samples comprises:
co-phasing the sequences of data samples received from each network device; and
combining the co-phased sequences.

11. The network controlling device of claim 10, wherein receiving the raw data from the plurality of network devices comprises:
establishing a high throughput link between the network controlling device and each of the plurality of network devices; and
backhauling the raw data by the network controlling device from the plurality of network devices through the high throughput links.

12. The network controlling device of claim 10, the set of processors further configured to control a set of distributed transceivers of a set of network devices in the plurality of network devices to utilize different modes of operation and to split the communication of the data streams amongst the set of distributed transceivers of each network device,
the modes of operation comprising a spatial diversity mode, a frequency diversity mode, a spatial multiplexing mode, a frequency multiplexing mode, and a multiple input multiple output (MIMO) mode.

13. The network controlling device of claim 10, the set of processors further configured to configure a set of distributed transceivers in each of the plurality of network devices to utilize different modulation schemes, beamforming configurations, constellations, protocols, frequencies, wireless standards, bandwidths to handle different types of data traffic and/or control traffic based on said received information.

14. The network controlling device of claim 10, the set of processors further configured to:
store the received data to generate a history of received data;
aggregate the history of received data with current data received from the plurality of network devices; and
control an adjustment of one or more configuration settings for one or more distributed transceivers and one or more antenna arrays of a set of network devices in the plurality of network devices based on the aggregated history of received data and the current data received.

15. The network controlling device of claim 10, wherein the received raw data corresponds to one or more of location information, propagation environment characteristics, physical environment characteristics and link quality.

16. The network controlling device of claim 10, wherein each network device comprises one of an access point, a router, a switching device, a gateway, and a set top box.

17. The network controlling device of claim 10, wherein the network controlling device is different than each of the plurality of network devices.

18. The network controlling device of claim 10, wherein the network controlling device is one of said plurality of network devices.

19. The network controlling device of claim 11, the processor configured to utilize information collected from the plurality of network devices to jointly identify and configure the beamforming settings for the antenna arrays of the plurality of distributed transceivers of the network devices in the plurality of network devices.

20. The network controlling device of claim 11, wherein the high-throughput link between the network controlling device and each of the network devices is a wireless link utilizing a sub-set of the plurality of distributed transceivers and the corresponding antenna arrays of the network devices.

21. The method of claim 1, where the controlling entity utilizes information collected from the plurality of network devices to jointly identify and configure the beamforming settings for the antenna arrays of the plurality of distributed transceivers of the network devices in the plurality of network devices.

22. The method of claim 2, wherein the high-throughput link between the controlling entity and each of the network devices is a wireless link utilizing a sub-set of the plurality of distributed transceivers and the corresponding antenna arrays of the network devices.

* * * * *